United States Patent
Rofougaran et al.

(10) Patent No.: US 9,569,003 B2
(45) Date of Patent: Feb. 14, 2017

(54) PORTABLE COMPUTING DEVICE INCLUDING A THREE-DIMENSIONAL TOUCH SCREEN

(75) Inventors: Ahmadreza (Reza) Rofougaran, Newport Coast, CA (US); Maryam Rofougaran, Rancho Palos Verdes, CA (US); Brima B. Ibrahim, Laguna Hills, CA (US); Hooman Darabi, Laguna Niguel, CA (US)

(73) Assignee: BROADCOM CORPORATION, Irvine, CA (US)

( * ) Notice: Subject to any disclaimer, the term of this patent is extended or adjusted under 35 U.S.C. 154(b) by 805 days.

(21) Appl. No.: 13/336,425

(22) Filed: Dec. 23, 2011

(65) Prior Publication Data

US 2012/0092284 A1    Apr. 19, 2012

Related U.S. Application Data

(63) Continuation-in-part of application No. 12/895,547, filed on Sep. 30, 2010, now Pat. No. 8,913,951.

(60) Provisional application No. 61/553,760, filed on Oct. 31, 2011, provisional application No. 61/551,045, filed on Oct. 25, 2011.

(51) Int. Cl.
   G06F 3/041      (2006.01)
   G06F 3/01       (2006.01)
   H04B 1/00       (2006.01)
   H04M 1/725      (2006.01)

(52) U.S. Cl.
   CPC ............... *G06F 3/017* (2013.01); *G06F 3/041* (2013.01); *H04B 1/00* (2013.01); *H04M 1/725* (2013.01); *G06F 2203/04108* (2013.01)

(58) Field of Classification Search
   CPC  G06F 3/041; G06F 2203/04108; G06F 3/017; H04B 1/00; H04M 1/725
   USPC ......................................................... 345/173
   See application file for complete search history.

(56) References Cited

U.S. PATENT DOCUMENTS

| | | | |
|---|---|---|---|
| 8,232,990 B2* | 7/2012 | King et al. ................... 345/419 |
| 8,483,617 B2* | 7/2013 | Rofougaran et al. ........ 455/63.1 |
| 9,215,023 B2* | 12/2015 | Rofougaran ............. H04J 1/00 |
| 9,270,139 B2* | 2/2016 | Rofougaran ............. H02J 1/10 |
| 2004/0021663 A1* | 2/2004 | Suzuki et al. ................ 345/419 |
| 2008/0165141 A1* | 7/2008 | Christie .................. G06F 3/044 |
| | | | 345/173 |
| 2009/0058829 A1* | 3/2009 | Kim ...................... G06F 3/0416 |
| | | | 345/173 |
| 2009/0102808 A1* | 4/2009 | Huang et al. ................. 345/173 |
| 2009/0295791 A1* | 12/2009 | Aguera y Arcas et al. .. 345/419 |

(Continued)

OTHER PUBLICATIONS

European Patent Office; European Search Report; EP Application No. 12007088.3; Dec. 21, 2015; 4 pgs.

*Primary Examiner* — Afroza Chowdhury
(74) *Attorney, Agent, or Firm* — Garlick & Markison; Bruce E. Stuckman

(57) ABSTRACT

A portable computing device includes a three-dimensional (3D) touch screen and a core module. The 3D touch screen includes a two-dimensional (2D) touch screen section and a plurality of radio frequency (RF) radar modules. The core module is operable to determine whether the 3D touch screen is in a 3D mode or a 2D mode. When the 3D touch screen is in the 3D mode, the core module is further operable to receive one or more radar signals via one or more of the plurality of RF radar modules and interpret the one or more radar signals to produce a 3D input signal.

21 Claims, 40 Drawing Sheets

(56) References Cited

U.S. PATENT DOCUMENTS

| | | | |
|---|---|---|---|
| 2010/0034238 A1* | 2/2010 | Bennett | H02J 5/005 375/130 |
| 2010/0085325 A1 | 4/2010 | King-Smith et al. | |
| 2010/0123839 A1* | 5/2010 | Lu | 349/15 |
| 2010/0321241 A1* | 12/2010 | Janosky | G01S 3/785 342/444 |
| 2011/0096024 A1 | 4/2011 | Kwak | |
| 2011/0115742 A1* | 5/2011 | Sobel et al. | 345/174 |
| 2011/0164029 A1* | 7/2011 | King et al. | 345/419 |
| 2011/0169698 A1* | 7/2011 | Niemi | H01Q 1/243 343/702 |
| 2011/0179368 A1* | 7/2011 | King et al. | 715/769 |
| 2011/0181509 A1* | 7/2011 | Rautiainen et al. | 345/158 |
| 2011/0187832 A1* | 8/2011 | Yoshida | 348/46 |
| 2011/0279397 A1* | 11/2011 | Rimon et al. | 345/173 |
| 2012/0023531 A1* | 1/2012 | Meuninck et al. | 725/100 |
| 2012/0023540 A1* | 1/2012 | Meuninck et al. | 725/118 |
| 2012/0091799 A1* | 4/2012 | Rofougaran | H02J 1/10 307/24 |
| 2013/0281024 A1* | 10/2013 | Rofougaran et al. | 455/63.1 |

* cited by examiner

3D Locating

Antenna 68

Dipole antenna pattern for touch screen conductive layers 70

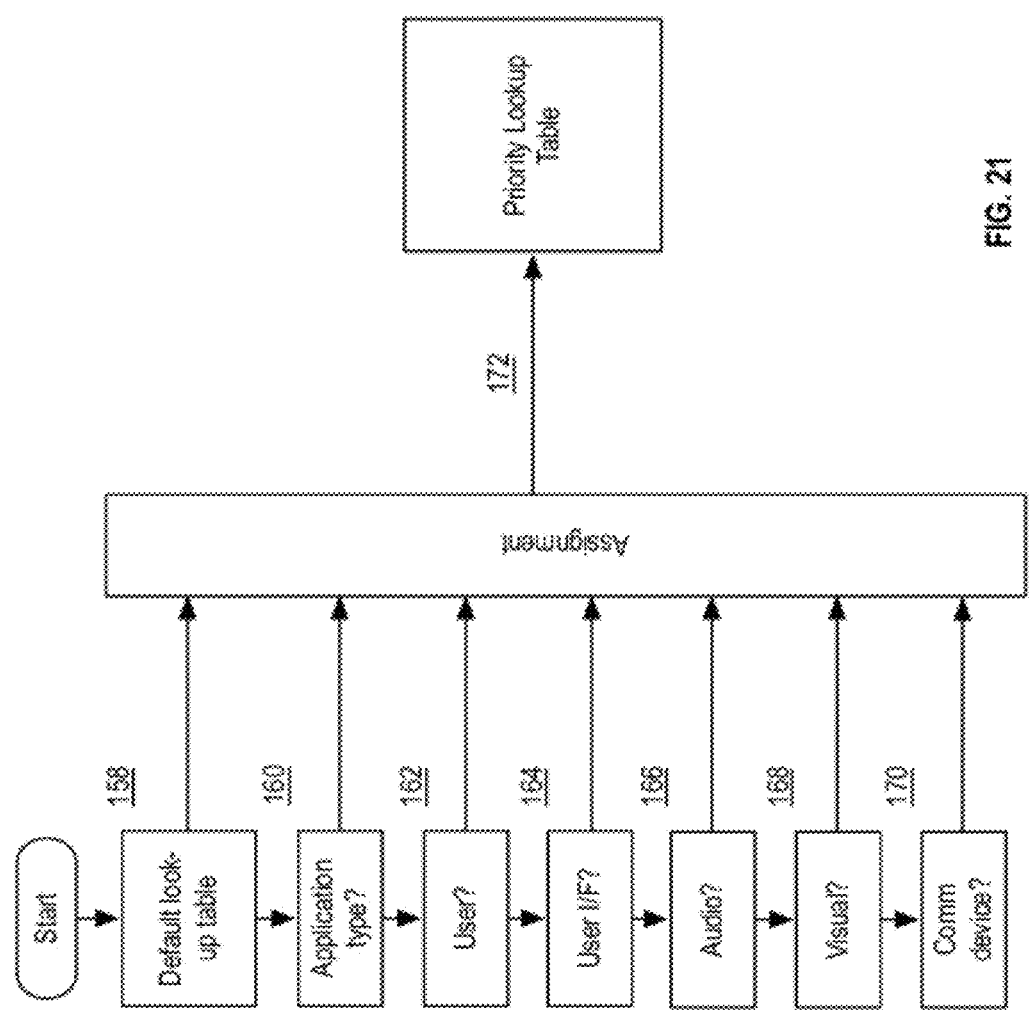

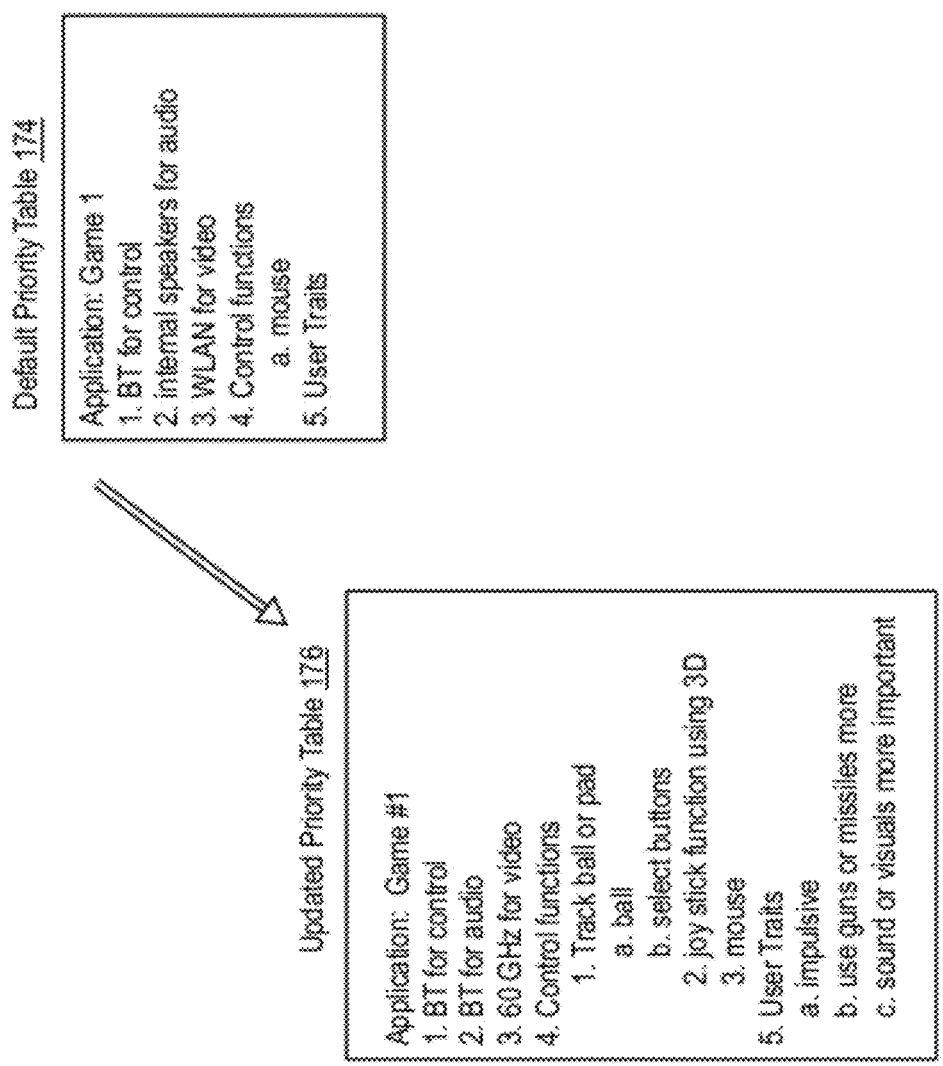

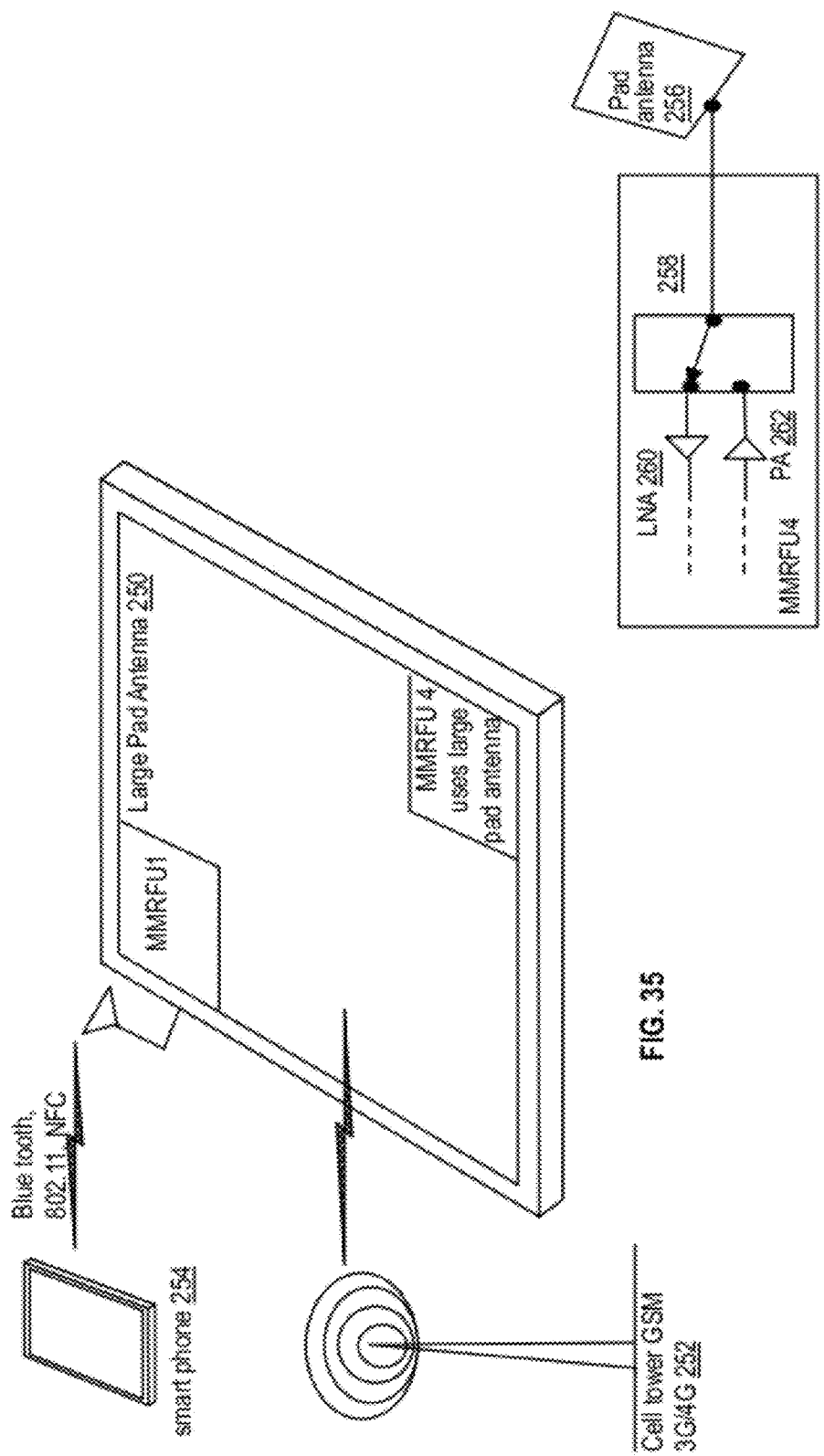

PORTABLE COMPUTING DEVICE INCLUDING A THREE-DIMENSIONAL TOUCH SCREEN

CROSS REFERENCE TO RELATED PATENTS

This patent application is claiming priority under 35 USC §119(e) to a provisionally filed patent application entitled RF BASED PORTABLE COMPUTING ARCHITECTURE, having a provisional filing date of Oct. 31, 2011, and a provisional Ser. No. 61/553,760, which is incorporated by reference herein in its entirety;

is claiming priority under 35 USC §119(e) to a provisionally filed patent application entitled RF BASED PORTABLE COMPUTING ARCHITECTURE, having a provisional filing date of Oct. 25, 2011, and a provisional Ser. No. 61/551,045, which is incorporated by reference herein in its entirety; and is claiming priority under 35 USC §120 as a continuation-in-part patent application of co-pending patent application entitled METHOD AND SYSTEM FOR 60 GHZ DISTRIBUTED COMMUNICATION UTILIZING A MESH NETWORK OF REPEATERS, having a filing date of Sep. 30, 2010, and a Ser. No. 12/895,547, pending, which is incorporated herein by reference in its entirety.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to communication systems and computers and more particularly to portable computing devices.

Description of Related Art

Portable computing devices include laptop computers, tablet computers, cellular telephones, video gaming devices, audio/video recording and playback devices, etc. In general, a portable computing device includes a central processing unit (CPU), an operating system, one or more user inputs (e.g., keyboard, mouse, microphone), one or more user output (e.g., display, speakers), memory, a network card (e.g., Ethernet and/or wireless local area network), and a battery.

In particular, a tablet computer includes a flat touch screen, a CPU, an operating system, a WLAN transceiver, a cellular data transceiver, a Bluetooth transceiver, a global positioning satellite (GPS) receiver, memory (e.g., solid state memory), connectors, and a rechargeable battery (e.g., lithium polymer). The flat touch screen includes capacitive touch screen technology to provide a virtual keyboard, a passive stylus pen (e.g., one touch selection based on X-Y coordinates of the touch), two-dimensional touch commands (e.g., sensing touch of the screen by one or more fingers and detecting movement in the X-Y dimensions of the one or more fingers), and provides the display.

The connectors connect the tablet computer to a power source to recharge the battery, to exchange data (e.g., audio files, video files, etc.) with another computing device (e.g., a personal computer (PC)), and/or to its update software. In addition or in the alternative, the WLAN transceiver or the data cellular transceiver may be used to update the tablet computer's software. Further, the Bluetooth transceiver may be used to exchange data with another computing device.

BRIEF DESCRIPTION OF THE SEVERAL VIEWS OF THE DRAWING(S)

FIG. 21 is a logic diagram of an embodiment of a method of building a priority look-up table for use within a portable computing device in accordance with the present invention;

FIG. 22 is a diagram illustrating an exemplary priority look-up table for use within a portable computing device in accordance with the present invention;

FIG. 23 is a diagram illustrating another exemplary priority look-up table for use within a portable computing device in accordance with the present invention;

FIG. 35 is a diagram of an another embodiment of a portable computing device operating as a microcell to support various communication schemes in accordance with the present invention;

FIG. 36 is a diagram of an exemplary pad antenna structure of a portable computing device in accordance with the present invention;

DETAILED DESCRIPTION OF THE INVENTION

Figure 1:
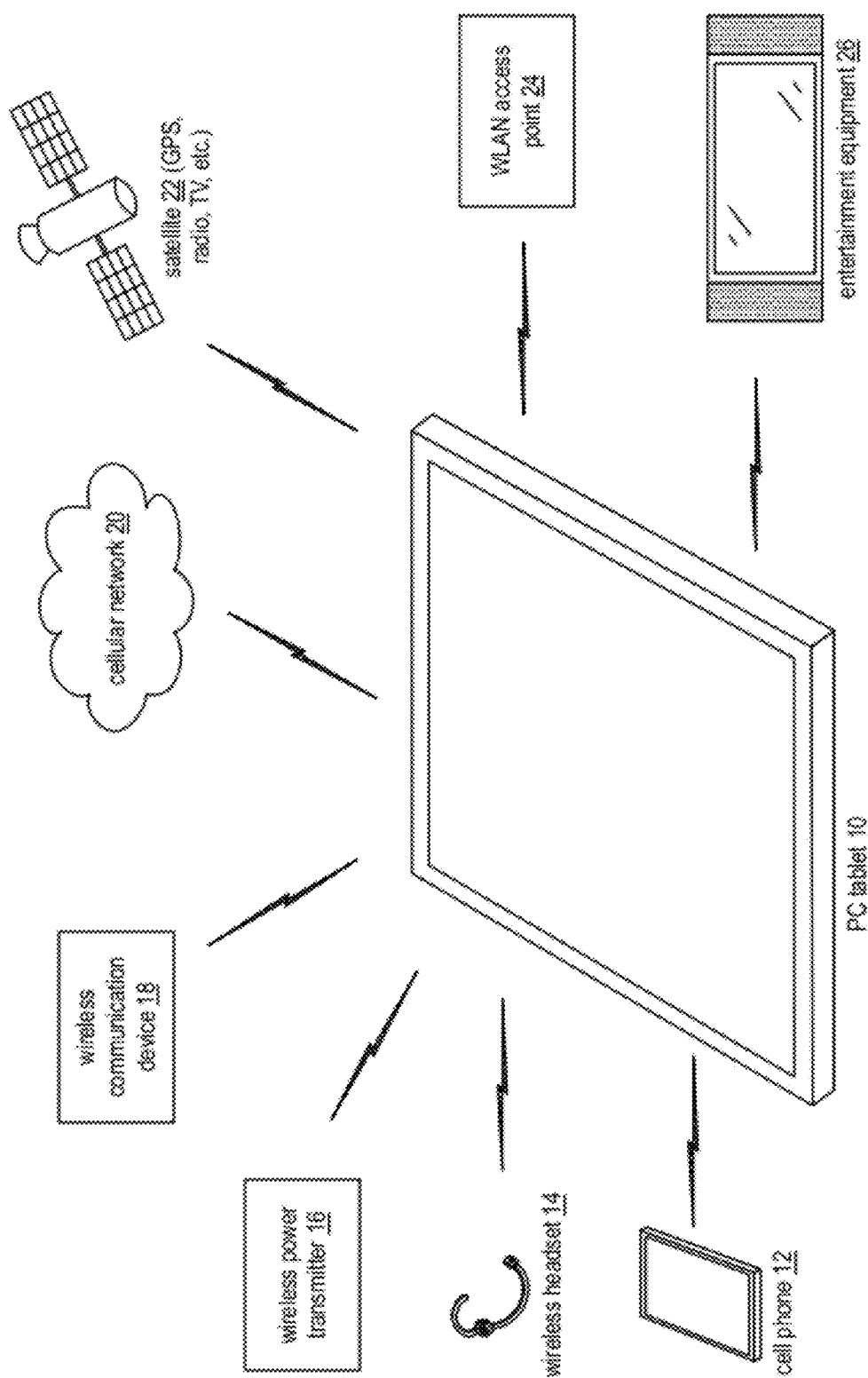
FIG. 1 is a diagram of an embodiment of a portable computing device in a communication environment in accordance with the present invention.

FIG. 1 is a diagram of an embodiment of a portable computing device in a communication environment. The portable computing device (e.g., a laptop computer, a tablet computer 10, a cellular telephone, a video gaming device, an audio/video recording and playback device, etc.) may communicate concurrently, or separately, with one or more of a cellular telephone 12, a wireless headset 14, a wireless power transmitter 16, a wireless communication device 18 (e.g., a tablet computer, a keyboard, a projector, a home appliance, a printer, a personal computer, a laptop computer, etc.), a cellular network 20 (voice and/or data), a satellite network 22 (e.g., GPS, satellite radio, satellite television, satellite telephone, etc.), a WLAN access point 24, and/or entertainment equipment 26.

Figure 2:
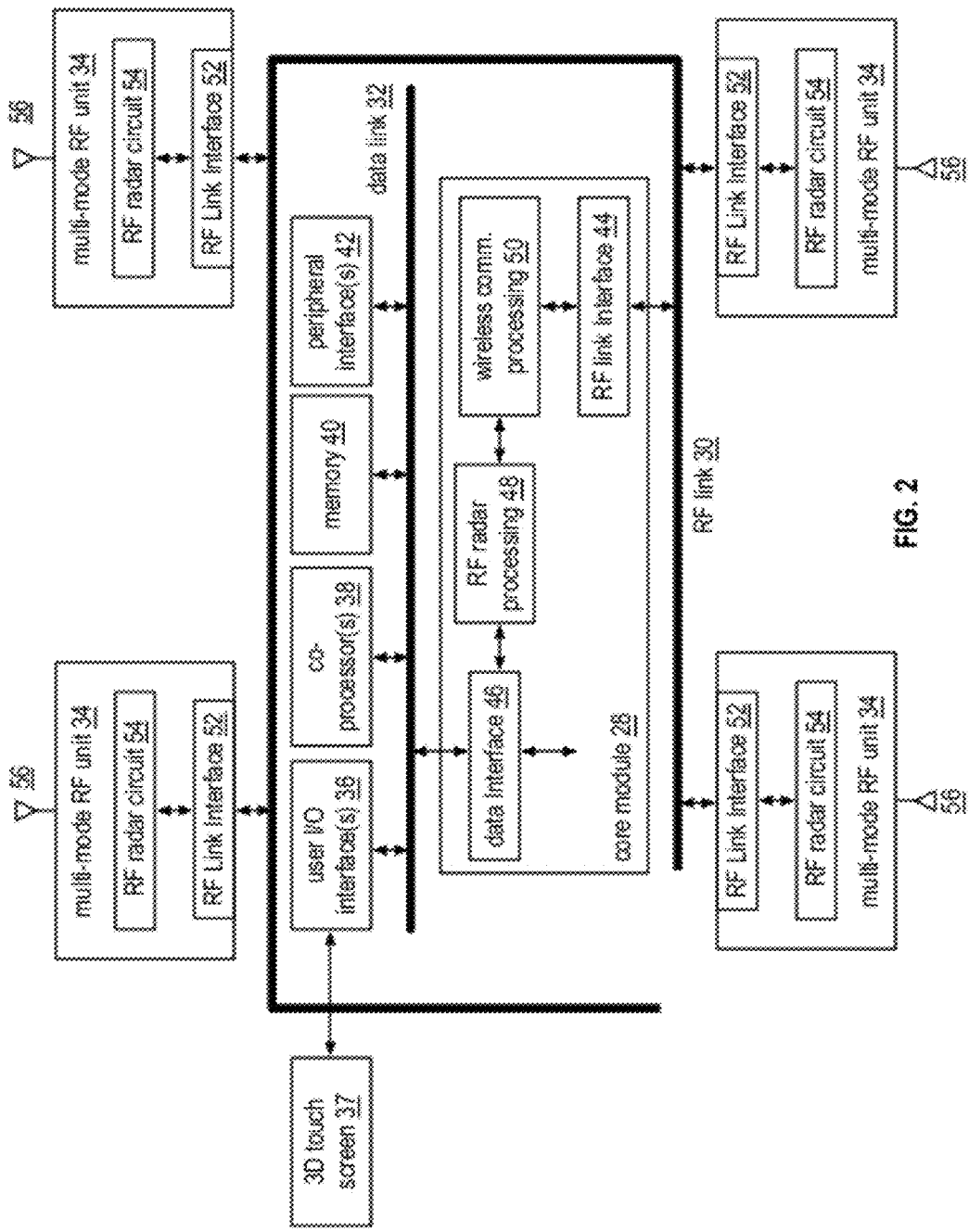
FIG. 2 is a schematic block diagram of an embodiment of a portable computing device in accordance with the present invention.

FIG. 2 is a schematic block diagram of an embodiment of a portable computing device that includes a core module 28, a radio frequency (RF) link 30, a data link 32, a plurality of multi-mode RF units 34, one or more user I/O interfaces 36 (e.g., to interface with one or more of a three-dimensional touch screen 37, a microphone, speakers, etc.), one or more co-processors 38, memory 40 (e.g., cache memory, main memory, solid state memory, etc.), and more one or more peripheral device interfaces 42 (e.g., USB, headset jack, etc). The core module 28 includes one or more of an RF link interface 44, a data link interface 46, a wireless communication processing module 50, and an RF radar processing module 48.

Each of the multimode RF units 34 includes an RF link interface 52, an RF radar circuit module 54, and one or more radio transceivers 56, or portions thereof. The one or more transceivers 56, or portions thereof, may support one or more wireless communication standards such as Bluetooth, IEEE 802.11 (WLAN), 60 GHz, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), extensions thereof, and/or variations thereof.

The data link 32 may include one or more of a twisted-pair, coaxial cable, a bus structure, fiber optics, etc. For example, if the data link 32 includes one or more twisted pairs, communication via the twisted pair(s) would be in accordance with one or more twisted pair signaling protocols (e.g., Cat 5 (10Base-TX & 100Base-T), Cat 5e (10Base-TX & 100Base-T), Cat 6a (10 GBase-T), EIA-485, secure transfer protocol, I.430, Controller Area Network, Sony/Philips Digital Interconnect Format, etc.). As another example, if the data link 32 includes one or more bus structures (e.g., an address bus, a control bus, and/or a data bus), communication via the bus structure would be in accordance with one or more computer type bus protocols (e.g., universal serial bus, peripheral component interconnect (PCI), PCI express, FireWire, S.-100 bus, Unibus, VAXBI, MBus, STD Bus, SMBUS, Q-Bus, ISA, Zorro, CAMAC, FASTBUS, LPC, Precision Bus, EISA, VME, VIX, NuBus, TURBOchannel, MCA, SBus, VLB, PXI, GSC bus, CoreConnect, InifiBand, UPA, PCI-X, AGP, QuickPath, HyperTransport, PC Card, ExpressCard, ST-506, ESDI, SMD, Parallel ATA, DMA, SSA, HIPPI, MSC, Serial ATA, SCSI, SCSI parallel, SCSI Serial, Fibre channel, iSCSI, ATAoE, MIDI, MultiBus, RS-232, DMX512-A, IEEE-488, EIA/RS-422, IEEE-1284, UNI/O, ACCESS.bus, 1-Wire, I$^2$C, SPI, etc.).

Each of the devices coupled to the data link 32 includes a data link interface. The data link interface performs the corresponding protocol conversion for accessing the data link 32. Note that each of the devices coupled to the data link 32 may include the same data link interfaces or different data link interfaces. For example, the memory 40 may include a different type of data link interface than a user input/output device.

The RF link 30 may include one or more of a coaxial cable, a fiber optics cable, a wireless channel, a waveguide, etc. Each device that couples to the RF link 30 includes an RF link interface that performs one or more RF link protocol conversions. For example, the RF link protocol may be one of a plurality of RF link protocols that indicates a particular data modulation scheme, carrier frequency, channel assignment, access protocol (e.g., Ethernet, FDMA, TDMA, CDMA, collision avoidance, etc.), and packet or frame formatting.

The core module 28 includes one more processing modules and performs a variety of functions. For example, the core module 28 may execute various user applications and system level applications of the portable computing device. In particular, the core module 28 may execute system level applications, such as an operating system, and user applications, such as a word processing application, a spreadsheet application, a contacts and calendar application, a plurality of games, one more web browsers, e-mail, a system set-up application, a file sharing application, etc. In executing these user applications, the core module 28 may shift one or more sub-functions to one or more of the coprocessors for execution therein.

The wireless communication processing module 50 includes one more processing modules and performs a variety of communication related functions. For example, when the processing module 28 is performing an application that requires a wireless communication, the wireless communication processing module 50 processes the corresponding data in accordance with one or more communication protocols (e.g., Bluetooth, IEEE 802.11, cellular data, cellular voice, 60 GHz, etc.). The wireless communication processing module 50 places the processed communication data on the RF link 30 for subsequent transmission by one or more of the multimode RF units 34.

For incoming communication data, one or more of the multimode RF units 34 receives a wireless signal and converts it into an inbound signal in accordance with the RF link protocol. The wireless communication processing module 50 receives the inbound signal from the RF link 30 and processes the inbound signal according to the appropriate communication protocol to extract the inbound data.

The RF radar processing module 48 includes one more processing modules and performs a variety of radar related functions. For example, when the core module 28 is running an application that requires a three-dimensional (x, y, z) user input, the RF radar processing module 48 communicates with one or more of the RF radar circuit modules 54 in the multimode RF units 34 to receive a respective reflected RF radar signal for use by the RF radar processing module 48 in calculating a three-dimensional position and/or a three-dimensional motion/displacement of a user-controlled object, such as a user's digit/extremity or stylus. The three-dimensional position and/or three-dimensional motion/displacement of the user-controlled object are then provided to the core module 28 to determine the three-dimensional user input.

To initiate the three-dimensional (3D) tracking of a user-controlled object, the core module 28 determines that the touch screen is in a 3D mode and then instructs the RF radar processing module 48 to begin the process of detecting and positioning one or more user-controlled objects. Three-dimensional tracking may be initiated automatically upon the portable computing device entering an active mode, when a particular application is running or as a result of a two-dimensional user input. The RF radar processing module 48 may then transmit a command via the RF link 30 to one or more of the RF radar circuit modules 54 to transmit and/or receive an RF radar signal.

In embodiments in which the RF radar processing module 48 instructs one or more RF radar circuit modules 54 to transmit an outgoing RF radar signal, each transmitting RF radar circuit module 54 generates a respective RF radar signal with or without a particular pulse repetition frequency for transmission via a respective transceiver 56 and antenna. The RF radar circuit modules 54 may employ frequency modulation and/or pulse modulation when transmitting RF radar signals. In addition, the RF radar circuit module 54 may utilize low frequency (e.g., 30-300 kHz) RF radar signals or any other frequency band up to and including extremely high frequency (e.g., 100 GHz or greater) RF radar signals.

In embodiments in which the RF radar processing module 48 instructs one or more RF radar circuit modules 54 to receive an incoming (reflected) RF radar signal, each receiving RF radar circuit modules 54 processes any received RF radar signals and converts the processed RF radar signals into respective inbound signals in accordance with the RF link protocol (e.g., generates inbound RF link signals). The RF radar processing module 48 receives the inbound radar signals from the RF link interface 44) (which converted the inbound RF link signal into the inbound radar signals) and processes the inbound radar signals according to the appropriate communication protocol to extract the data for use in calculating the three-dimensional position of the user-controlled object.

In one embodiment, the RF radar circuit modules 54 process the received reflected RF radar signals to filter any undesired signals due to noise or interference and provide the processed RF radar signals to the RF radar processing module 48. In another embodiment, the RF radar circuit modules 54 further process the processed RF radar signals to measure the time of reflection, frequency, frequency shift (Doppler effect) and/or perform any other radar signal measurements, and provide the radar signal measurements to the RF radar processing module 48. In still another embodiment, the RF radar circuit modules 54 further process the radar signal measurements to calculate location information indicating the distance and/or angle from the RF antenna of the multimode RF unit 34 to the user-controlled object (e.g., the user's digit/extremity or stylus), and provide the location information to the RF radar processing module 48.

From the location information, the RF radar processing module 48 may utilize, for example, a triangulation or trilateration technique to determine the position of the user-controlled object relative to the plane of the portable computing unit. The core module 28 can then convert the object's position into the appropriate user input for the application. It should be understood that location information from four or more multimode RF units 34 may be needed to accurately determine the geographical position (x, y, z) of an object above the surface of the portable computing unit. It should further be understood that in embodiments in which the RF radar circuit modules 54 either process the received RF radar signals or compute radar signal measurements and provide the processed RF radar signals or radar signal measurements to the RF radar processing module 48, the RF radar processing module 48 calculates the radar signal measurements and/or location information for each of the multimode RF units 34.

The RF link may be divided into multiple frequency bands. As an example, the frequency spectrum of the RF link is divided into three frequency bands: one for address and/or control information, a second for data, and a third for clock signals. In addition, power may be communicated via the RF link to the multimode RF units at DC or at a low AC frequency (e.g., 60 Hz). Each of the frequency bands may be divided into a plurality of channels and may utilize one or more of a variety of multiplexing access protocols (e.g., time division multiple access, frequency division multiple access, code division multiple access (CDMA), orthogonal frequency division multiplexing, etc.) to carry data.

In this example, a low-frequency band (e.g., hundreds of kilohertz to hundreds of megahertz) is used for conveying address and/or control information. A mid frequency band (e.g., hundreds of megahertz to tens of gigahertz) is used for conveying data (e.g., voice, text, audio files, video files, graphics, etc.) and may be used to convey the RF radar signals from the MM RF units to the core module. A high-frequency band (e.g., ten gigahertz to hundreds of gigahertz) is used to carry a clock tone or a modulated clock signal.

As a specific example, when the wireless communication processing module and one or more of the multimode RF units have control and/or address information to exchange, they do so via the frequency band allocated to such communications. As another specific example, when the wireless communications processing module and one or more of the multimode RF units have data (or radar signals) to exchange, they do so via the frequency band allocated to a data communications. As yet another specific example, the wireless communication processing module generates a clock tone and/or a modulated clock signal and transmits it via the RF link to the multimode RF units using the frequency band allocated to the clock. Each of the multimode RF units utilizes the clock tone or modulated clock signal to generate one or more clocks for use therein. As yet a further specific example, the RF link radar signals may be conveyed in a fourth frequency band of the RF link, which may be above or below the second frequency band.

Figure 3:
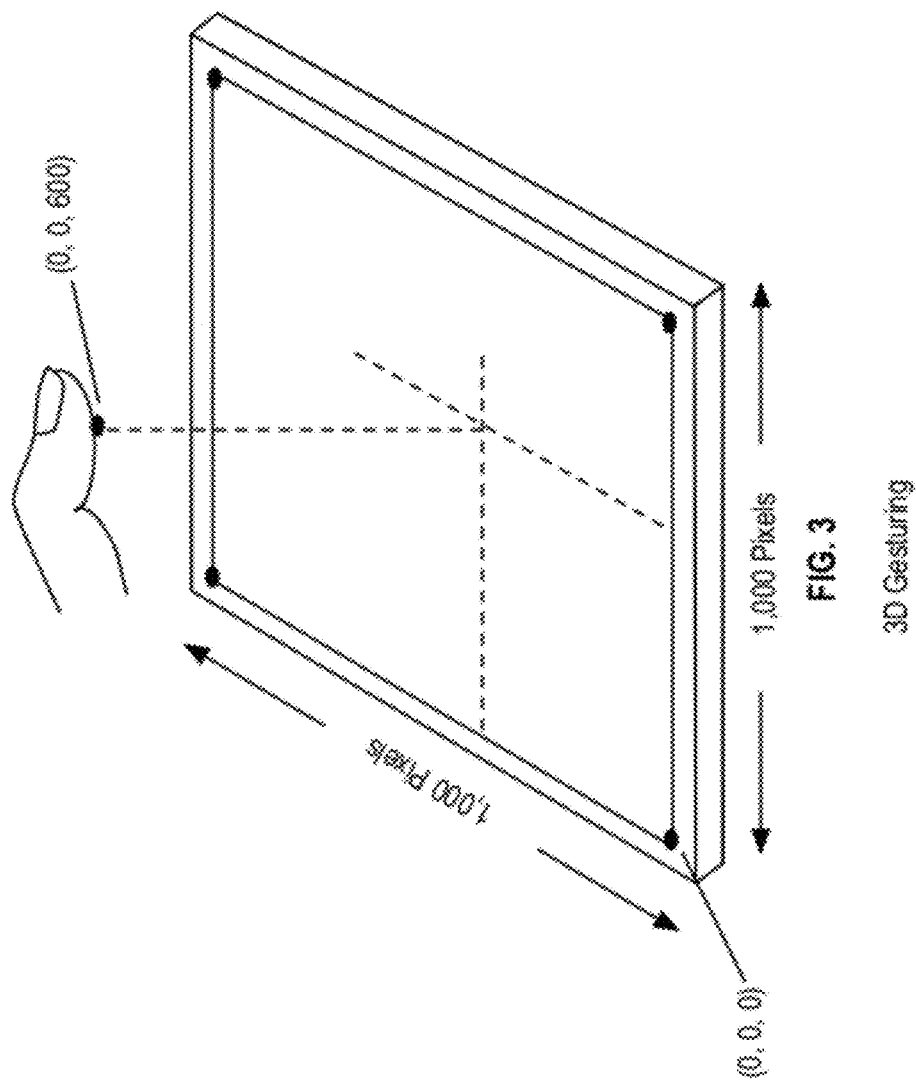
FIG. 3 is a diagram of an embodiment of a three-dimensional touchscreen of a portable computing device in accordance with the present invention.

FIG. 3 is a diagram of an embodiment of a three-dimensional touchscreen of a portable computing device. The portable computing device, such as a tablet, includes a touchscreen containing a touch-sensitive panel for two-dimensional user input and one or more RF radar antennas and corresponding radar circuit modules for three-dimensional user input. The touch-sensitive panel can detect the presence and two-dimensional (2D) location (x, y) of a touch (by, e.g., a user's digit/extremity or stylus) within the panel area. By way of example, but not limitation, the touch-sensitive panel may be a resistive touchscreen panel, a surface wave touchscreen panel, an infrared touchscreen panel, an optical imaging touchscreen panel, a dispersive signal touchscreen panel, an acoustic pulse recognition touchscreen panel or a capacitive touchscreen panel.

The RF radar antennas are each coupled to a respective multimode RF unit and operate to transmit and/or receive RF radar signals to enable three-dimensional user input. For example, the three-dimensional touchscreen can be used to locate a user's finger or other user-controlled object in the near-field three-dimensional space (x, y, z) above the touchscreen. The coordinate system utilized to determine the three-dimensional location may, for example, designate one corner of the 2D touchscreen as having coordinates (0, 0, 0) (i.e., the origin), assign each pixel in the plane of the touchscreen to a different planar (x, y) coordinate and assign each elevation (height) above the plane of the touchscreen a different z-coordinate, such that the distance between sequential elevations corresponds to the distance between sequential pixels along one of the axes of the touchscreen. Therefore, the portable computing device can easily translate the three-dimensional location and motion of a user's finger or other object into a three-dimensional user input.

In some embodiments, the three-dimensional user input is a 3D gesture made by the user's finger or other object. To detect the 3D gesture, the portable computing device tracks the movement of the user's finger or other object in the three-dimensional space above the touchscreen. Tracking can be performed by using the Doppler effect (e.g., by measuring a frequency shift between the transmit and receive frequencies) and/or by using a particular pulse repetition frequency (number of transmitter pulses per unit time) to enable measurements to be taken at sufficient intervals to track motion of the object. For example, in one embodiment, the RF radar processing module can compare a current 3D location of the user-controlled object to one or more previous 3D locations of the user-controlled object to determine both the distance between the locations and the direction of motion from the previous location(s) to the current location. The RF radar processing module can then use the distance and direction of motion information to identify a particular 3D gesture, which corresponds to a particular 3D input signal.

The three-dimensional user input may be used in a variety of applications. By way of example, but not limitation, such applications may include 3D drawing, holographic touch imaging or 3D interactive gaming. In addition, three-dimensional user input may be utilized in traditional two-dimensional applications to provide an additional dimension of control or enable a user to provide input without requiring the user to physically touch the touchscreen. For example, the user may be able to touch up a photo or drawing, shade a color and/or fade it or give more dimension to an image using a 3D gesture.

Figure 4:
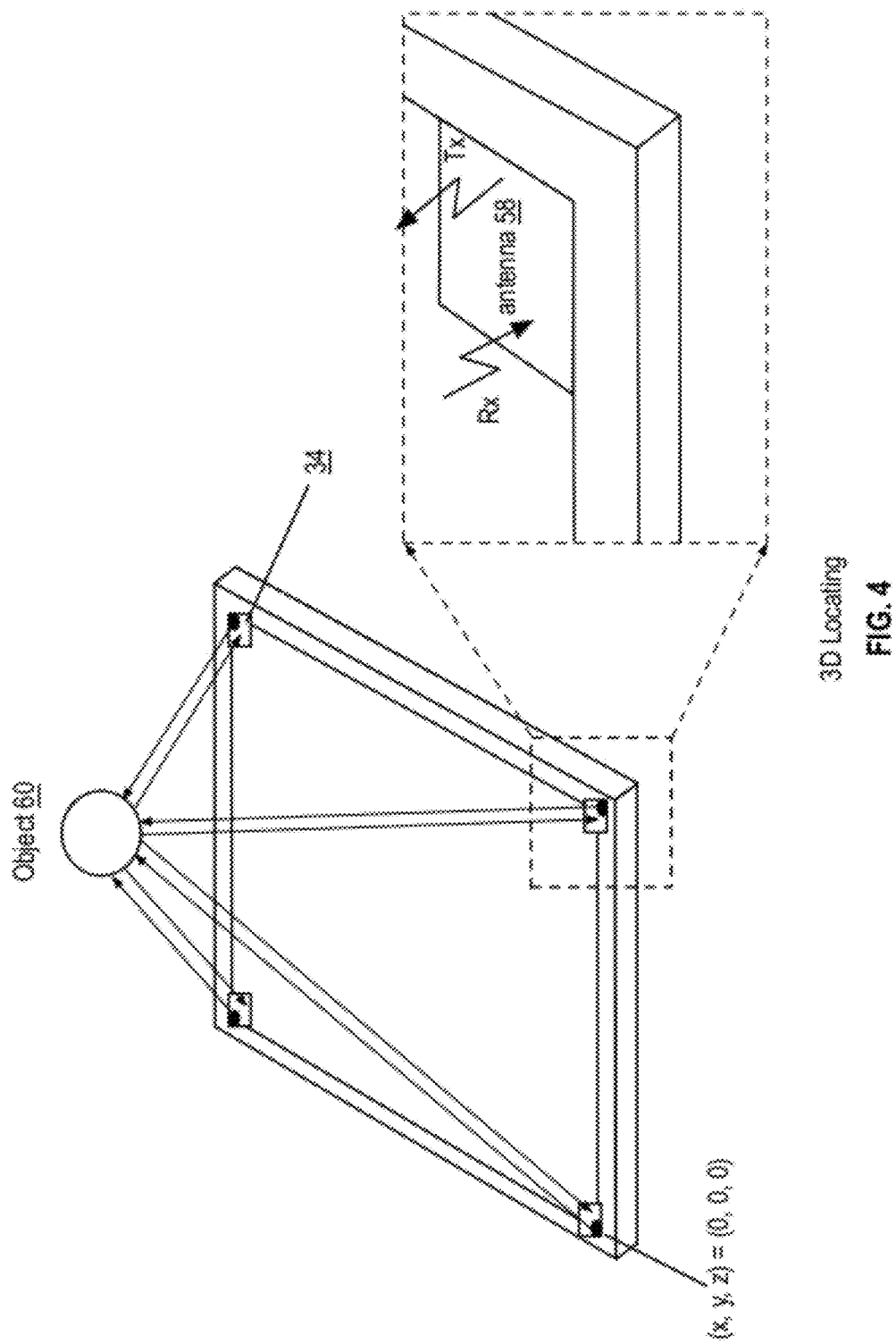
FIG. 4 is a diagram of another embodiment of a three-dimensional touchscreen of a portable computing device using RF radar in accordance with the present invention.

In one embodiment, as shown in FIG. 4, multimode RF units 34 can be positioned at the corners of the touchscreen. Each multimode RF unit 34 may include one or more RF radar antennas 58. Antennas 58 may be shared for both transmit and receive operations or separate antennas 58 can be utilized for TX and RX.

The RF radar antennas 58 may include any mixture of designs including monopole, dipole, horn, dish, patch, microstrip, isotron, fractal, yagi, loop, helical, spiral, conical, rhombic, j-pole, log-periodic, slot, turnstile, collinear, and nano. In addition, multiple antennas 58 may be used within each multimode RF unit 34, and the multiple antennas 58 may be geometrically arranged such that they form a phased array antenna to transmit outbound RF radar signals as a transmit beam in a particular direction of interest.

The particular combination of RF radar antennas 58 utilized by each of the multimode RF units 34 on the touchscreen enables any object 60 within a desired scanning area (e.g., near-field three-dimensional space above the touchscreen) to be detected. In one embodiment, the scanning area includes the radiation pattern of each of the multimode RF units 34. For example, each multimode RF unit 34 may be able to transmit and receive radar signals over the entire scanning area. In another embodiment, each multimode RF unit 34 transmits and receives radar signals to one or more unique portions of the scanning area with substantially no overlap of their radiation patterns. In yet another embodiment, some multimode RF units 34 have overlapping radiation patterns while others do not.

To achieve the desired scanning area and overlap between multimode RF units 34, each of the RF radar antennas can be either an omni-directional antennas or a directional antenna. In embodiments in which one or more the RF radar antennas are directional antennas (e.g., a phased array antenna), each directional RF radar antenna may be configured to preferentially radiate in a particular direction above the touchscreen panel surface. For example, the RF radar antenna positioned at coordinates (x, y, z)=(0, 0, 0) may be configured to radiate in a direction towards the RF radar antenna positioned at the opposite corner of the touchscreen to enable coverage of a three-dimensional area roughly bound by the dimensions of the touchscreen. Such an antenna configuration minimizes interference and reduces artifacts from objects located outside the three-dimensional area above the touchscreen.

Figure 5:
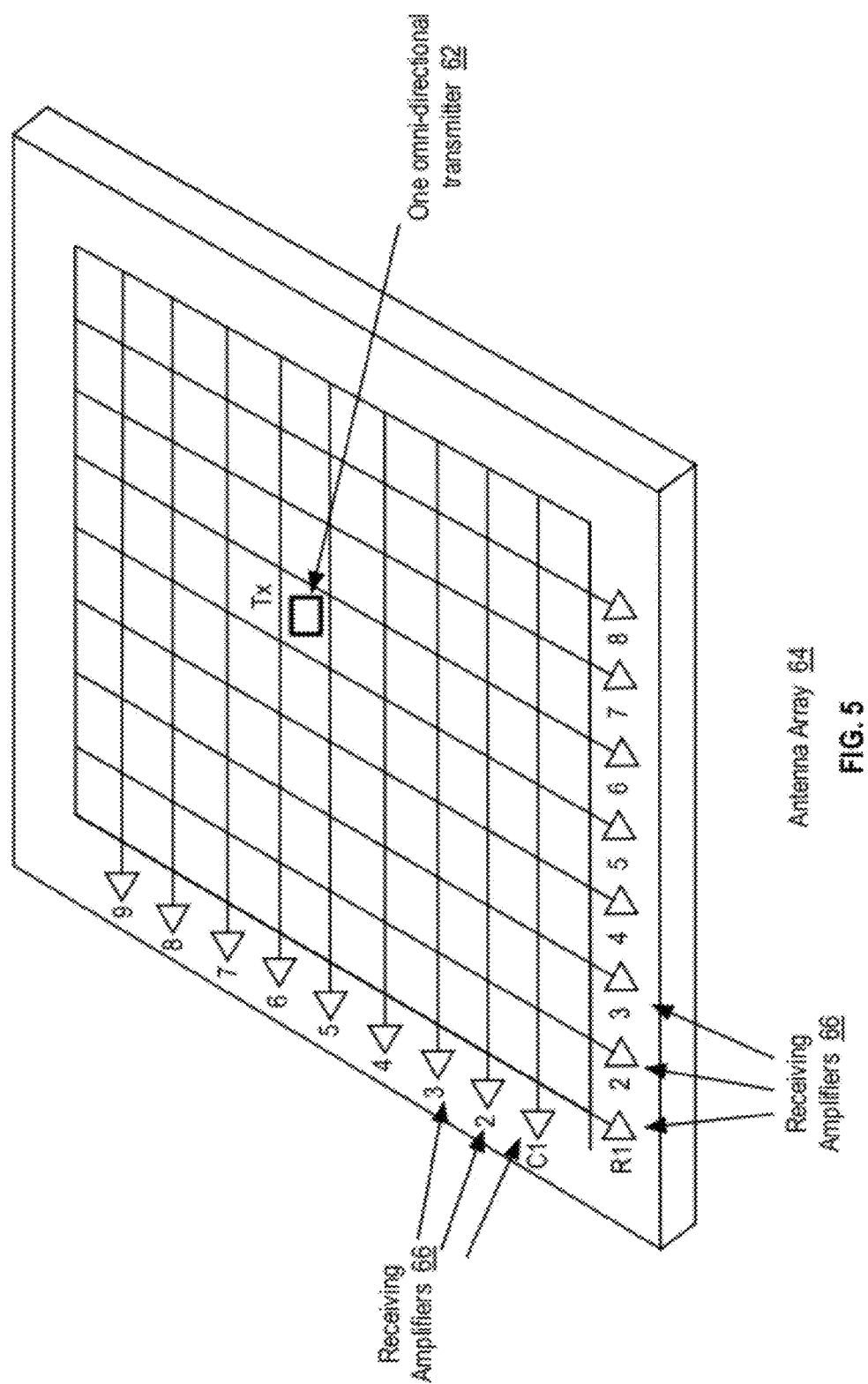
FIG. 5 is a diagram of another embodiment of three-dimensional touchscreen a portable computing device using a receive antenna array in accordance with the present invention.

In another embodiment, as shown in FIG. 5, a single omni-directional RF radar transmitting module 62 (which may include an antenna, an antenna interface, a power amplifier, an oscillator, and/or an up conversion mixing circuit) can be used, together with an array of RF radar receiving modules 64 (each of which may include an antenna, an antenna interface, a receiver amplifier, an oscillator, and/or a down conversion mixing circuit). In FIG. 5, a plurality of RF radar receiving modules 64 is positioned in an array (or grid), arranged in rows and columns, under the panel surface (not shown) of the touchscreen. In one embodiment, the antennas of the RF radar modules 62 and 64 are placed on top of the touchscreen conductive layers, while the x-y grid of transmission lines is formed under the conductive layers of the touchscreen. In another embodiment, as discussed below in connection with FIG. 11, the antennas of the RF radar and transmission lines are contained within the conductive layers of the touchscreen. Different configurations may also be envisioned depending on the type of touchscreen.

Each of the RF radar receiving antennas is operable to receive a reflected RF radar signal reflected from an object positioned in the three-dimensional space above the touchscreen. Row and column selectors can select the rows and columns of the array to read out the signals received by individual RF radar antennas or to sequentially or globally read out rows and/or columns in the array 64. In one embodiment, as shown in FIG. 5, the antennas of modules 64 are coupled to transmission lines to provide the received RF radar signals to a receiver amplifier 66 (of the modules 64 or separate amplifiers) dedicated to the particular row or column within which the antenna is located. Each receiver amplifier 66 can be coupled to a respective receiver and RF radar circuit or a single receiver and RF radar circuit may be used for all antennas. In the latter scenario, the antennas would be read out individually to enable the receiver to sequentially process each received RF radar signal. Other configurations, such as using one receiver for two or more rows or columns, may also be envisioned. Note that a single RF radar circuit may also be coupled to multiple receivers.

In another embodiment, each of the RF radar receiving antennas may be coupled to a respective receiver within the array such that the receivers are coupled to the transmission lines and the output of the receivers is read out of the rows/columns into one or more RF radar circuits. The RF radar receivers may be selected for read out by the RF radar circuit using a query/addressing mechanism, or the receivers may be assigned a particular time slot to transmit the received signals to the RF radar circuit using, for example, TDMA. The omni-directional RF radar transmitting antenna may transmit the RF radar signal at a single frequency or multiple frequencies. If the RF radar transmitting antenna uses multiple frequencies, different RF radar antenna/receivers can be configured to receive different frequencies to enable multiple receivers to be read out on the same transmission line simultaneously.

In yet another embodiment, instead of using an x-y grid of transmission lines, a multiple data path bus may be utilized to provide a respective receive path from each RF radar antenna/receiver to the RF radar circuit. Further variations are also possible for the RF radar receiving antenna array.

Figure 6:
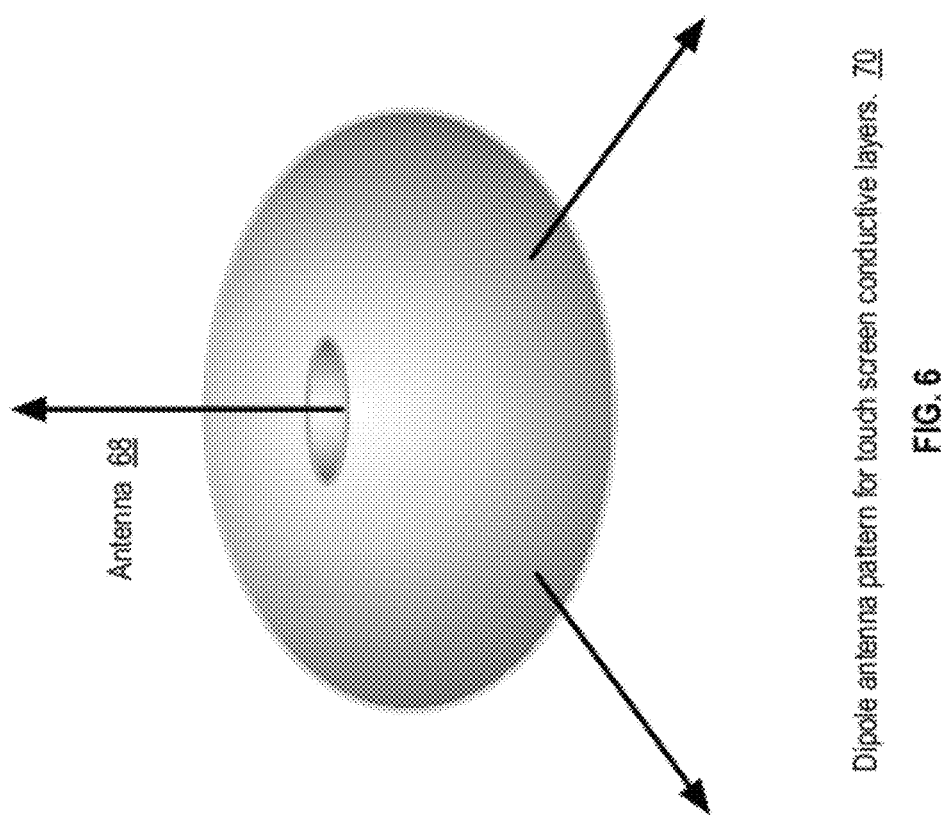
FIG. 6 is a diagram illustrating an exemplary antenna pattern of a transmit antenna for use within a three-dimensional touchscreen of a portable computing device in accordance with the present invention.

The omni-directional antenna may be, for example, a dipole or monopole antenna. An example of a dipole antenna emission pattern 70 is shown in FIG. 6. The antenna 68 can be oriented to provide maximum emission in the three-dimensional space above the touchscreen.

Figure 7:
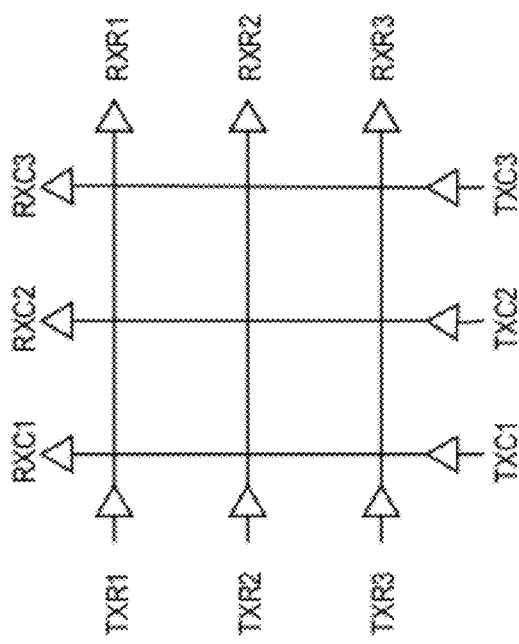
FIG. 7 is a diagram illustrating an exemplary transmit/receive antenna array for use within a three-dimensional touchscreen of a portable computing device in accordance with the present invention.

In another embodiment, as shown in FIG. 7, an array of RF radar transmit/receive antennas can be used. In one embodiment, each antenna is either in a transmit mode or a receive mode, so that at any given time, a particular RF radar antenna is not both transmitting and receiving. However, in embodiments in which Doppler is used to measure the speed/motion of the user-controlled object, the RF radar antennas may be continuous-wave radar antennas that transmit unmodulated or modulated continuous wave radar signals, and therefore, the RF radar antennas may be configured to transmit and receive substantially simultaneously.

Figure 8:
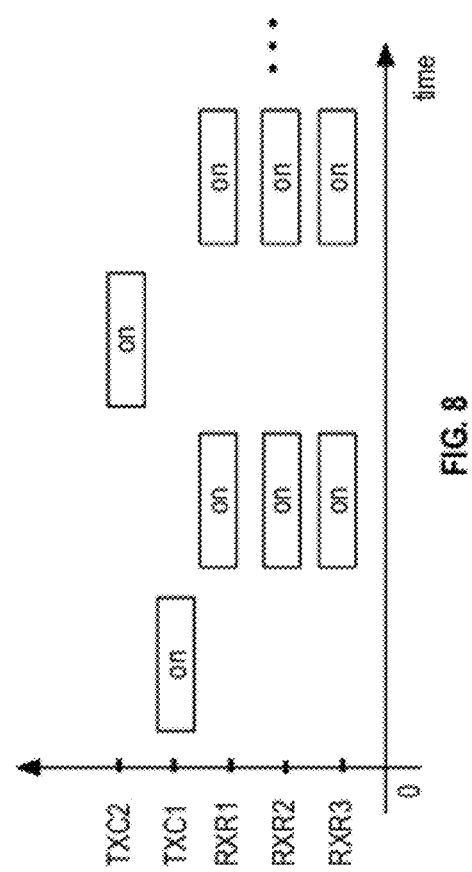
FIG. 8 is a diagram illustrating an example operation of a selective transmit/receive antenna array for use within a three-dimensional touchscreen of a portable computing device in accordance with the present invention.

The RF radar antennas may also be selected individually or on a row/column basis to facilitate targeted transmission and/or reception of RF radar signals. An exemplary timing diagram is shown in FIG. 8 for a sample operation of the selective transmit/receive antenna array of FIG. 7. At an initial time (t1), the RF radar antennas in column 1 can be switched into a transmission mode by enabling transmission line TxC1 to cause the RF radar antennas in column 1 to transmit respective RF radar signals. Then, at a subsequent time (t2), all of the antennas can be switched into a reception mode by enabling transmission lines RxR1, RxR2 and RxR3 to cause all of the antennas to receive respective reflected RF radar signals. Then, at time t3, the RF radar antennas in column 2 can be switched into a transmission mode by enabling TxC2 to cause the RF radar antennas in column 2 to transmit respective RF radar signals. Then, at time t4, all of the antennas can again be switched into a reception mode by enabling RxR1, RxR2 and RxR3 to cause all of the antennas to receive respective reflected RF radar signals.

Figure 9:
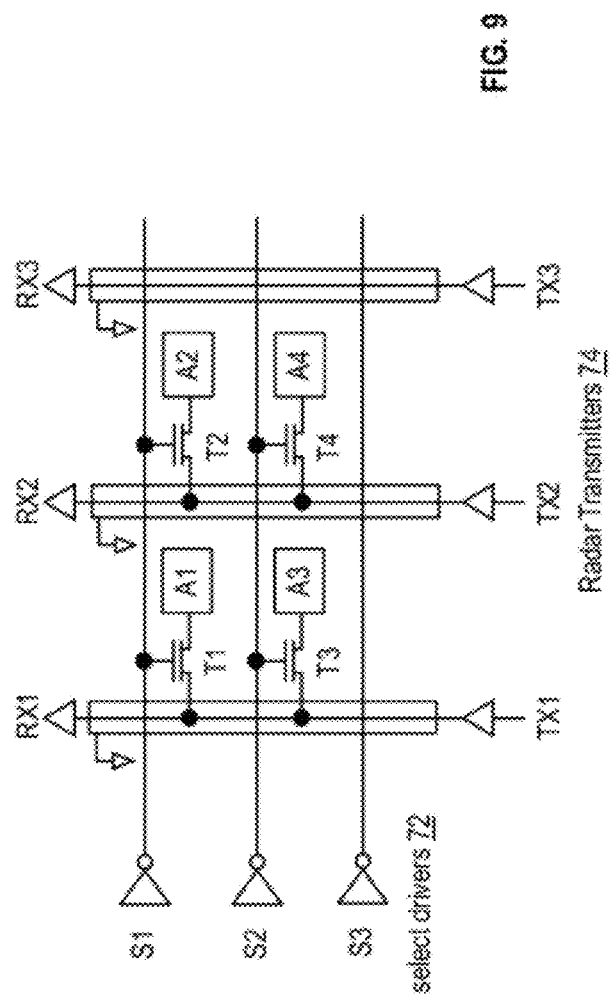
FIG. 9 is a circuit diagram of an exemplary selective transmit/receive antenna array for use within a three-dimensional touchscreen of a portable computing device in accordance with the present invention.
Figure 10:
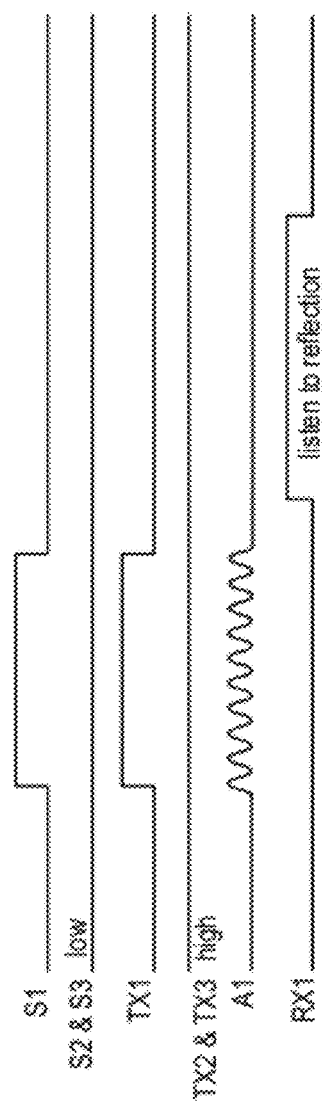
FIG. 10 is a diagram illustrating another example operation of a selective transmit/receive antenna array for use within a three-dimensional touchscreen of a portable computing device in accordance with the present invention.

FIG. 9 is a circuit diagram of an exemplary selective transmit/receive antenna array. Each antenna A1-A4 is coupled to a respective select transistor T1-T4. Select drivers 72 S1-S3 correspond to row selectors that allow a respective row of antennas or individual antenna within that row to be selected for transmission or reception along respective column transmission lines, depending on the signal present on the transmission lines 74 Tx/Rx. For example, referring now to the diagram of FIG. 10, antenna A1 is selected for transmission by turning on transmission line Tx1 and driver S1, while drivers S2 and S3 and transmission lines TX2 and TX3 are turned off. After transmission by antenna A1, driver S1 can be turned on again to enable antenna A1 to receive reflected RF radar signals.

Figure 11:
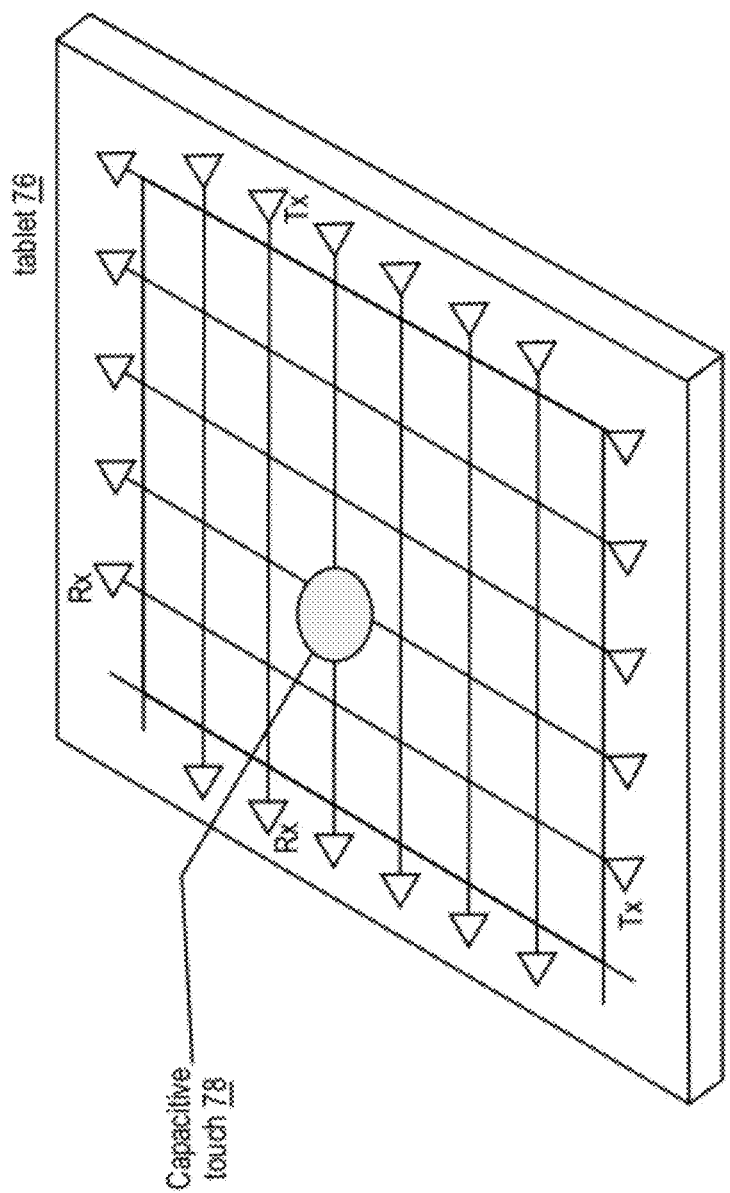
FIG. 11 is a diagram of another embodiment of a three-dimensional touchscreen of a portable computing device in accordance with the present invention.

FIG. 11 is a diagram of another embodiment of a three-dimensional touchscreen of a portable computing device 76. In FIG. 11, the array of transmit/receive RF radar antennas are incorporated into the conductive layers of the capacitive touch screen, so that the row/column electrical lines are shared by the RF radar antennas and the touchscreen capacitors 78. In one embodiment, the touchscreen operates in either an RF radar mode or a capacitive mode. The RF radar mode may be automatically deactivated when a change in capacitance is detected or the user may manually activate or deactivate the RF radar mode. In another embodiment, the touchscreen operates in both the RF radar mode and the capacitive mode simultaneously. For example, some applications may enable a user to augment a 2D capacitive touch command with a 3D RF radar gesture.

Figure 12:
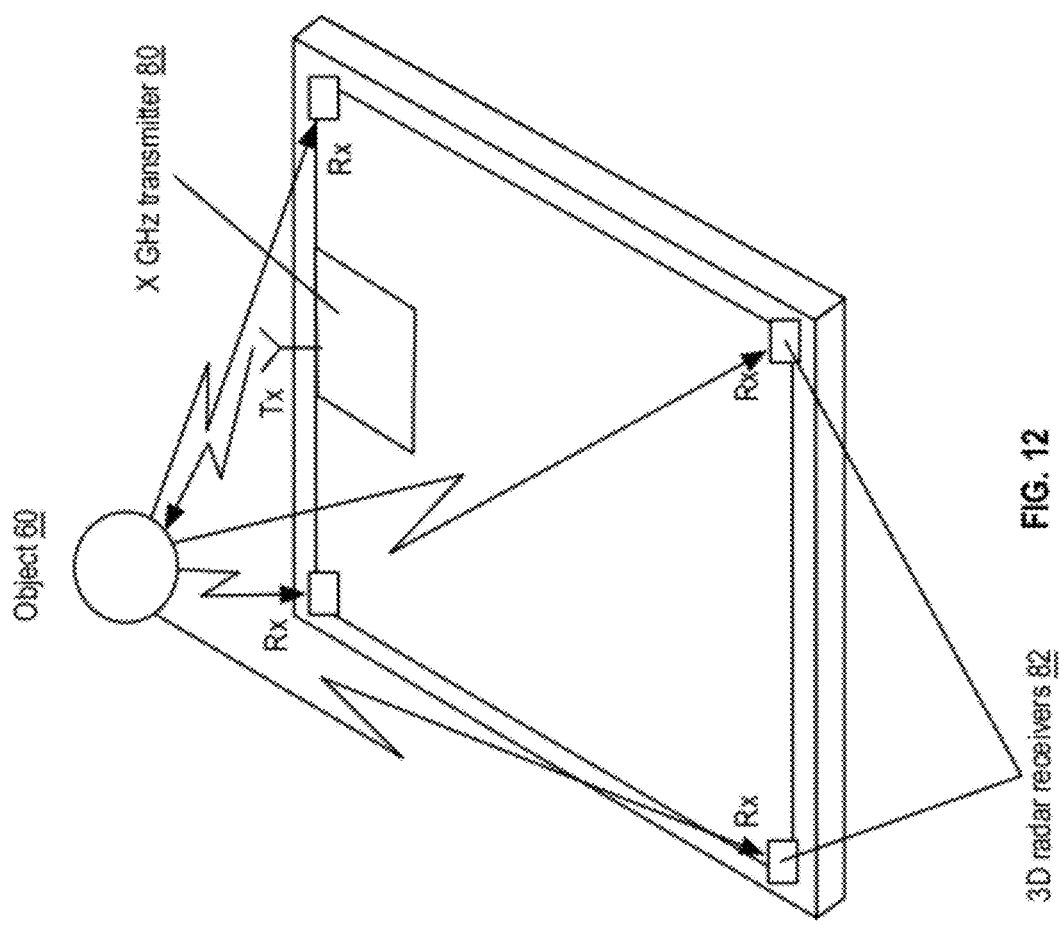
FIG. 12 is a diagram of another embodiment of a three-dimensional touchscreen of a portable computing device using GHz radar in accordance with the present invention.

FIG. 12 is a diagram of another embodiment of a three-dimensional touchscreen of a portable computing device. In FIG. 12, the RF radar transmitting antenna 80 transmits an RF radar signal in the GHz range. In one embodiment, the RF radar signal may be anywhere in the GHz range. In other embodiments, the RF radar signal is between 5 GHz and 100 GHz. RF radar receiving antennas 82 are positioned at the corners of the touchscreen to measure the reflected RF radar signals reflected off of an object 60 positioned above the touchscreen. Since radar signals in the GHz range are at least partially absorbed by the human body, in some embodiments, the reflected RF radar signals received by the RF radar receiving antennas 82 can be utilized to construct a three-dimensional image of the user-controlled object 60 (e.g., a user's digit or extremity).

Figure 13:
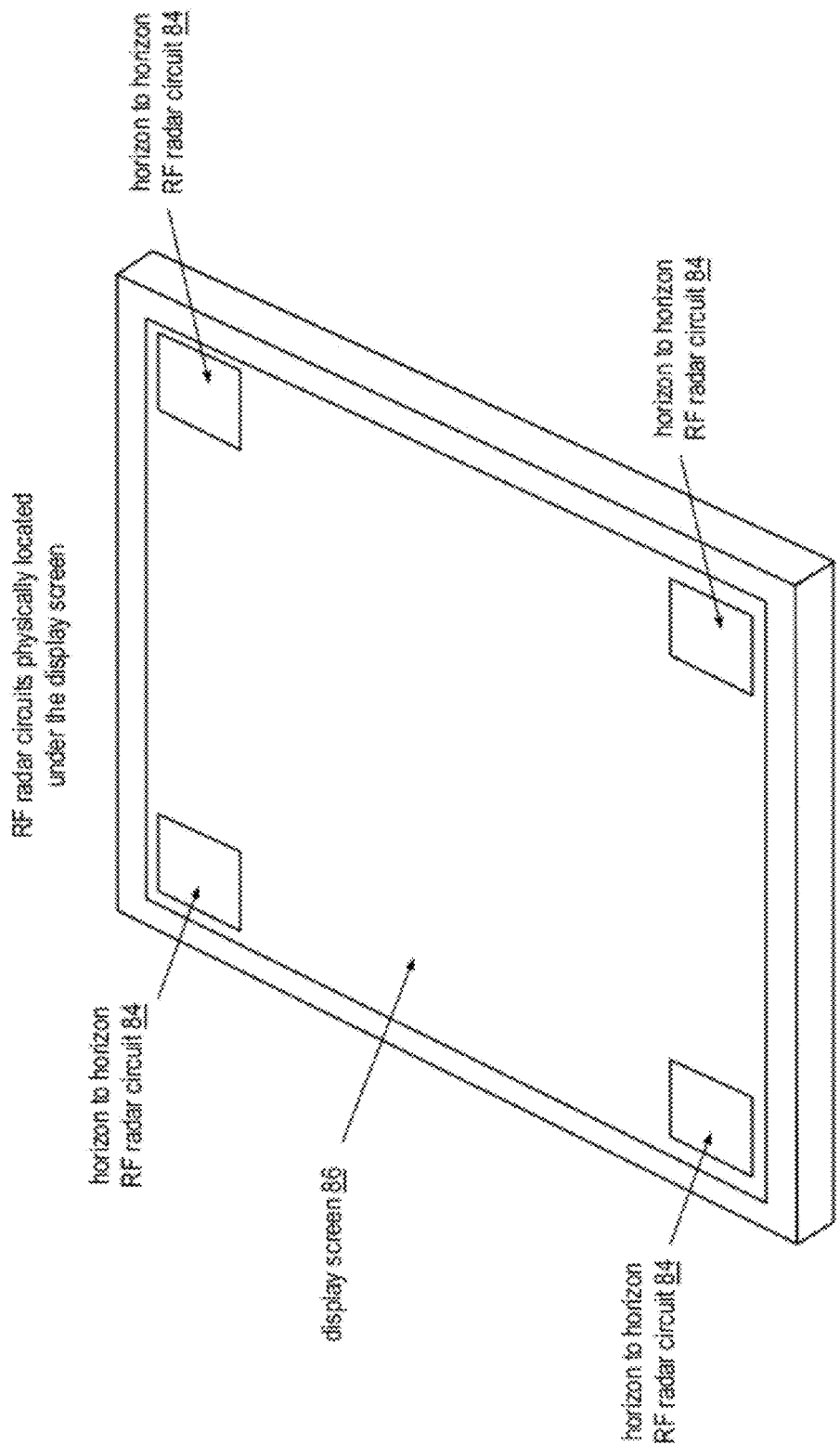
FIG. 13 is a diagram of an embodiment of a portable computing device using horizon-to-horizon RF radar in accordance with the present invention.

FIG. 13 is a diagram of another embodiment of a portable computing device 76 using horizon-to-horizon RF radar to provide a three-dimensional user input touch screen. In FIG. 13, instead of including a separate touch-sensitive panel to provide two-dimensional user input, the display screen 86 includes horizon-to-horizon RF radar circuits 84 that can detect both two-dimensional and three-dimensional user inputs and generate corresponding input signals. In an exemplary embodiment, the horizon-to-horizon RF radar circuits 84 within corresponding multimode RF units are positioned at the corners of the display screen 86, with each horizon-to-horizon RF radar circuit 84 including a respective Tx/Rx radar antenna to both transmit and receive RF radar signals. The horizon-to-horizon RF radar circuits 84 produce RF radar signals that are transmitted at and above the horizon of the display screen 86, so that a user-controlled object can be detected not only in the three-dimensional space above the display screen 86, but also while in contact with (i.e., touching) the display screen 86. Thus, the horizon-to-horizon RF radar display screen effectively functions as a touchscreen.

Antenna structures for the horizon-to-horizon RF radar circuits 84 can be constructed, for example, using non-magnetic metal-dielectric photonic crystals to produce artificial magnetic conductors. For example, alternating current sheets can be stacked in the photonic crystals to create a strong magnetic dipole density for specific frequency bands. In an exemplary embodiment, a projected artificial magnetic mirror (PAMM) fabricated using such stacked photonic crystals is included in the antenna structure to function as an electric field reflector for the RF radar antenna within a particular frequency band, as described in more detail below in connection with FIG. 16.

Figure 14:
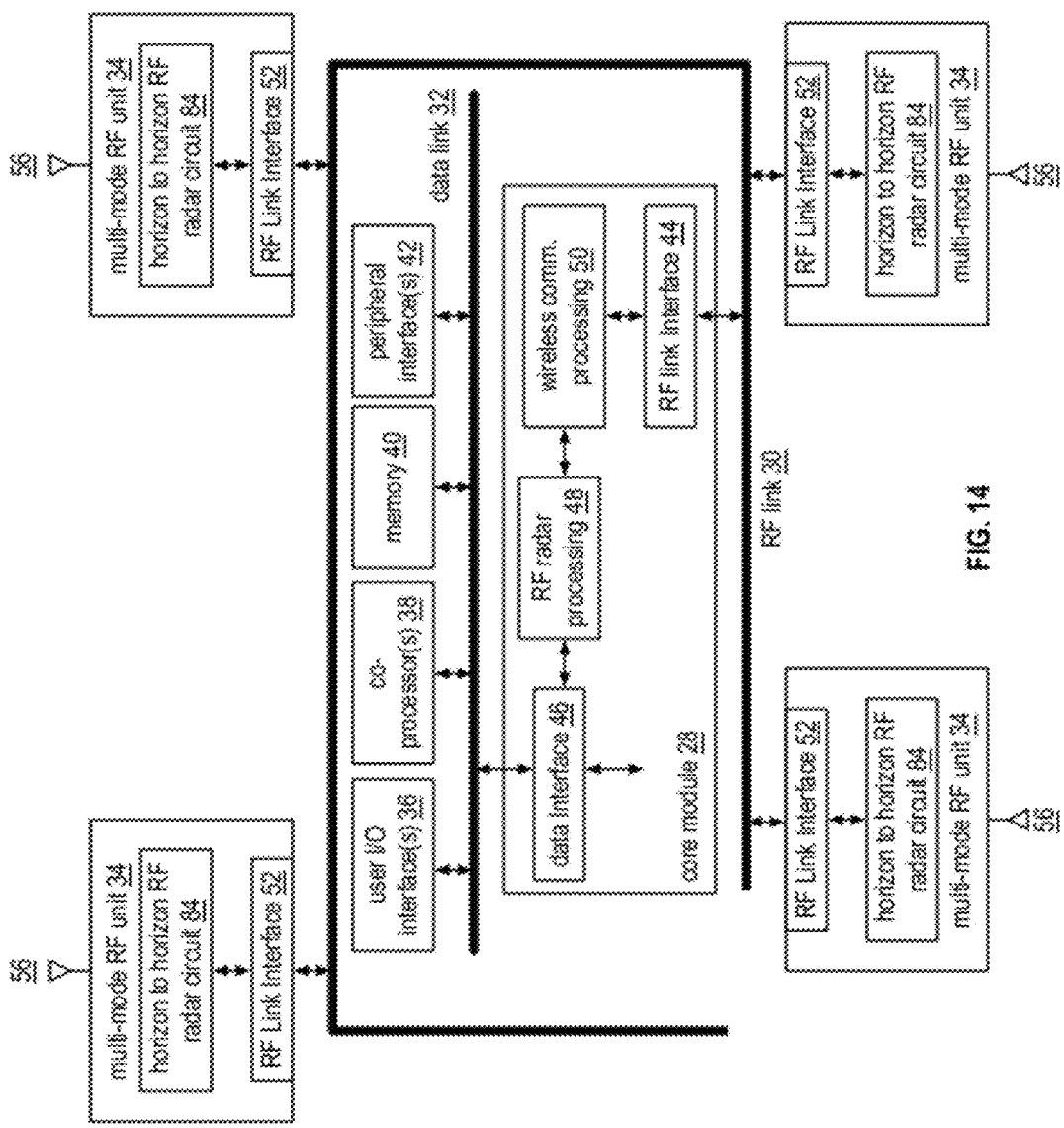
FIG. 14 is a schematic block diagram of another embodiment of a portable computing device using horizon-to-horizon RF radar in accordance with the present invention.

FIG. 14 is a schematic block diagram of another embodiment of a portable computing device using horizon-to-horizon RF radar. The portable computing device includes a core module 28, a radio frequency (RF) link 30, a data link 32, a plurality of multimode RF units 34, one or more user I/O interfaces 36 (e.g., one or more of a flat screen touch panel, a microphone, speakers, etc.), one or more co-processors 38, memory 40 (e.g., cache memory, main memory, solid state memory, etc.), and more one or more peripheral device interfaces 42 (e.g., USB, headset jack, etc), as described above in connection with FIG. 2. The core module 28 includes one or more of an RF link interface 44, a data link interface 46, a wireless communication processing module 50, and an RF radar processing module 48, as also described above in connection with FIG. 2.

Each of the multimode RF units 34 includes an RF link interface 52, a horizon-to-horizon radar circuit 84 and one or more radio transceivers 56, or portions thereof. Each horizon-to-horizon RF radar circuit 84 includes an antenna structure utilizing an artificial magnetic conductor to transmit an RF radar signal along the surface of the portable computing device and in the three-dimensional space above the display screen of the portable computing device to enable RF radar signals to be reflected off of objects in contact with the display screen of the portable computing device and objects positioned in the near-field three-dimensional space above the display screen of the portable computing device. As such, the horizon-to-horizon RF radar circuits 84 enable the location of a user-controlled object to be resolved as either a two-dimensional location on the display screen or a three-dimensional location above the display screen. Note that communication between the core module and the MM RF units is conducted in a similar manner as discussed in the embodiment of FIG. 2.

Figure 15:
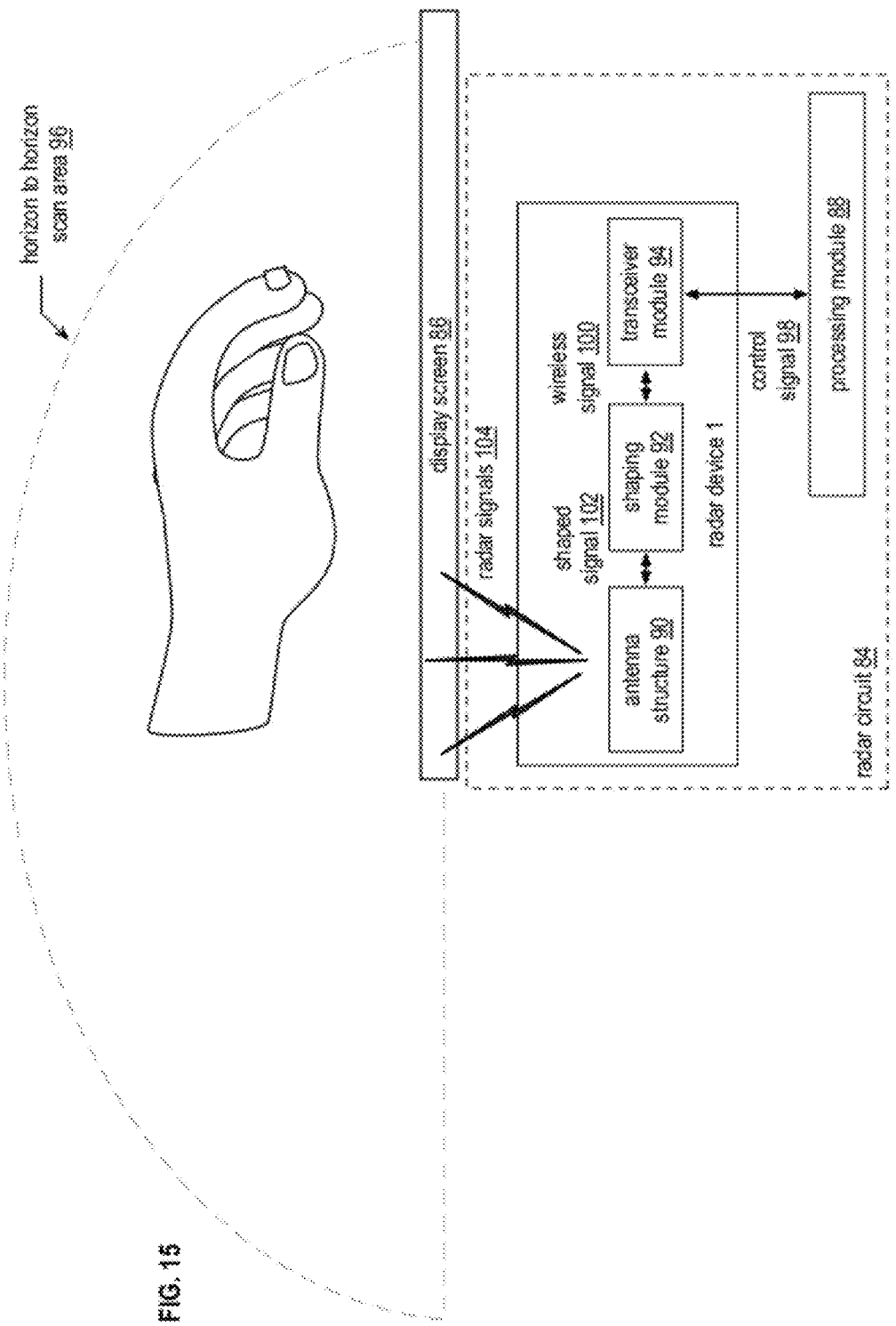
FIG. 15 is a schematic block diagram of an exemplary a horizon-to-horizon radar circuit for use within a portable computing device in accordance with the present invention.

FIG. 15 is a schematic block diagram of an exemplary a horizon-to-horizon RF radar circuit 84 for use within a portable computing device. The horizon-to-horizon RF radar circuit (radar circuit) 84 includes one or more radar devices and a processing module 88. The radar device includes an antenna structure 90 that includes a projected artificial magnetic mirror (PAMM), as previously described, a shaping module 92 and a transceiver module 94.

The processing module 88 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 88 may have an associated memory and/or memory element, which may be a single memory device, a plurality of memory devices, and/or embedded circuitry of the processing module 88. Such a memory device may be a read-only memory, random access memory, volatile memory, non-volatile memory, static memory, dynamic memory, flash memory, cache memory, and/or any device that stores digital information. Note that if the processing module 88 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 88 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

In an example of operation, the radar circuit 84 functions to detect location information regarding objects in its scanning area 96 (e.g., a horizon-to-horizon area associated with the display screen of the portable computing device). The location information may be expressed in two-dimensional (e.g., the z component of x, y, z coordinate system is at or near zero (e.g., a few millimeters to a few centimeters)) or three-dimensional terms and may vary with time (e.g., velocity and acceleration). For example, relative location information may include the distance between the object and the radar circuit and/or angle between the object and the radar circuit.

The radar circuit may detect objects and determine the location information in a variety of ways in a variety of frequency bands. The radar circuit may operate in the 60 GHz band or any other band in the 30 MHz to 300 GHz range as a function of coverage optimization and system design goals to meet the needs of a particular application.

The location information may be determined by the radar circuit when the radar device is operating in different modes including continuous wave (CW) transmission, pulse transmission, separate transmit (TX) and receive (RX) antennas, and shared transmit (TX) and receive (RX) antennas. The radar device may operate under the control of the processing module 88 to configure the radar device to operate in accordance with the operating mode.

For example, in a pulse transmission mode, the processing module 88 sends a control signal 98 to the radar device to configure the mode and operational parameters (e.g., pulse transmission, 60 GHz band, separate transmit (TX), and receive (RX) antennas, work with other radar devices). The control signal 98 includes operational parameters for each of the transceiver module 94, the shaping module 92, and the antenna module 90. The transceiver 94 receives the control signal 98 and configures the transceiver 94 to operate in the pulse transmission mode in the 60 GHz band.

The transceiver module 94 may include one or more transmitters and/or one or more receivers. The transmitter may generate an outbound wireless signal 100 based on an outbound control signal 98 from the processing module 88. The outbound control signal 98 may include control information to operate any portion of the radar device and may contain an outbound message (e.g., a time stamp) to embed in the outbound radar signal 104. Note that the time stamp can facilitate determining location information for the CW mode or pulse mode.

In the example, the transceiver 94 generates a pulse transmission mode outbound wireless signal 100 and sends it to the shaping module 92. Note that the pulse transmission mode outbound wireless signal 100 may include a single pulse, and/or a series of pulses (e.g., pulse width less than 1 nanosecond every millisecond to once every few seconds). The outbound radar signal 104 may include a time stamp message of when it is transmitted. In an embodiment, the transceiver 94 converts the time stamp message into an outbound symbol stream and converts the outbound symbol stream into an outbound wireless signal 100. In another embodiment, the processing module 88 converts the outbound message into the outbound symbol stream.

The shaping module 92 receives the control signal 98 (e.g., in the initial step from the processing module 88) and configures to operate with the antenna module 90 with separate transmit (TX) and receive (RX) antennas. The shaping module 92 produces one or more transmit shaped signals 102 for the antenna module 90 based on the outbound wireless signal 100 from the transceiver 94 and on the operational parameters based on one or more of the outbound control signal 98 from the processing module 88 and/or operational parameters from the transceiver 94. The shaping module 92 may produce the one or more transmit shaped signals 102 by adjusting the amplitude and phase of outbound wireless signal 100 differently for each of the one or more transmit shaped signals 102.

The antenna structure 90 radiates the outbound radar signal 104 through the display screen 86 creating a transmit pattern in accordance with the operational parameters and mode within the scanning area 96. The antenna structure 90 may include one or more antennas. Antennas may be shared for both transmit and receive operations.

The radar device receives an inbound radar signal 104 via the antenna structure 90 that results from the outbound radar signal 104 reflecting, refracting, and being absorbed in part by the object in the scanning area 96. The antenna structure 90 sends the inbound radar signal 104 to the shaping module 92 as a shaped signal 102. The shaped signal 102 may be the result of the inbound radar signal 104 impinging on one or more antennas that comprise the antenna structure 90 (e.g., an array). For example, the amplitude and phase will vary slightly between elements of a phased array.

The shaping module 92 produces one or more inbound wireless signals 100 for the transceiver 94 based on one or more receive shaped signals 102 from the antenna structure 90 and on the operational parameters from one or more of the processing module 88 and/or the transceiver 94. The shaping module 92 may produce the one or more inbound wireless signals 100 by adjusting the amplitude and phase of one or more receive shaped signals 102 differently for each of the one or more receive shaped signals 102.

In an embodiment, the radar device transceiver 94 generates an inbound control signal 98 based on the inbound wireless signal 100 from the shaping module 102. The inbound control signal 98 may include the status of the operational parameters, inbound wireless signal parameters (e.g., amplitude information, timing information, phase information), and an inbound message decoded from the inbound wireless signal 100. The transceiver 94 converts the inbound wireless signal 100 into an inbound symbol stream and converts the inbound symbol stream into the inbound message (e.g., to decode the time stamp). In another embodiment, the processing module 88 converts the inbound symbol stream into the inbound message.

The processing module 88 determines location information about the object based on the inbound radar signal 104 received by the radar device. In particular, the processing module 88 may determine the distance to the object based on the time stamp and the time at which the radar device received the inbound radar signal 104. Since the radar signals 104 travel at the speed of light, the distance can be readily determined.

The transceiver module 94 and/or processing module 88 may later send updated operational parameters to the shaping module 92 to alter the pattern of the receive antenna array prior to transmitting the next outbound radar signal 104. The determination may be based on a pre-determined list or may be based in part on an analysis of the received information so far (e.g., track the receive antenna pattern towards the object where the pattern yields a higher amplitude of the inbound wireless signal 100).

The above process may be repeated until the radar device has produced an inbound wireless signal peak for the corresponding receive antenna array pattern. The processing module 88 may then determine the angle of arrival of the inbound radar signal 104 based on the receive antenna array settings (e.g., shaping module operational parameters and antennas deployed).

Note that the transceiver 94, shaping module 92, and antenna structure 90 may be combined into one or more radar device integrated circuits operating at 60 GHz. As such, the compact packaging more readily facilitates integration into the portable computing device for applications such as player motion tracking for gaming consoles.

With the inclusion of a PAMM, the antenna structure 90 can have a full horizon to horizon sweep, thus substantially eliminating blind spots of radar systems for objects near the horizon (e.g., substantially eliminates avoiding radar detection by "flying below the radar"). This is achievable since the PAMM substantially eliminates surfaces waves that dominate conventional antenna structures for signals having a significant angle of incidence (e.g., greater than 60 degrees). Without the surface waves, the in-air beam can be detected even to an angle of incidence near 90 degrees.

Figure 16:
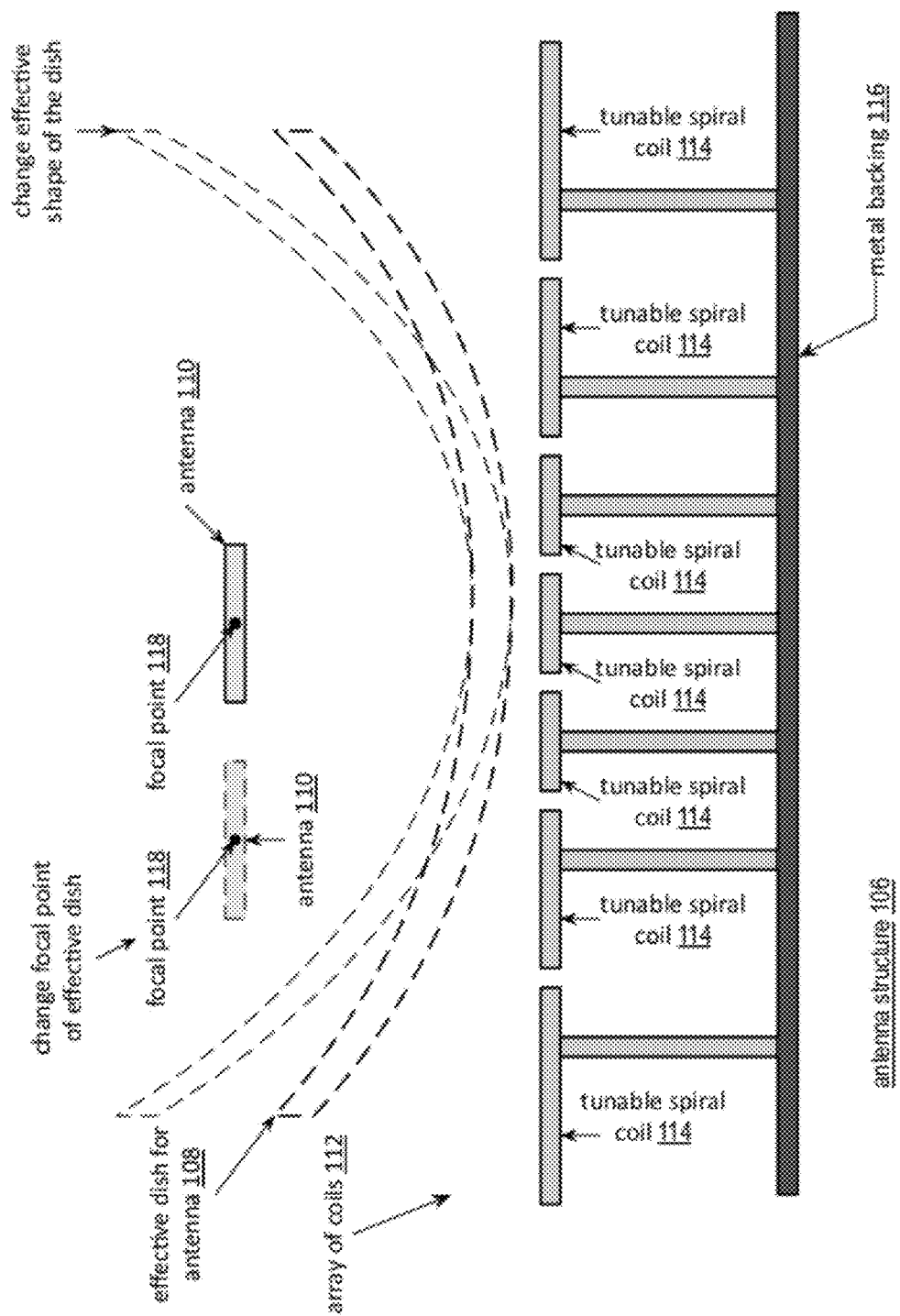
FIG. 16 is a diagram of an exemplary horizon-to-horizon antenna structure for use within a portable computing device in accordance with the present invention.

FIG. 16 is a diagram of an exemplary horizon-to-horizon antenna structure 106 for use within a portable computing device. The antenna structure 106 is an adjustable effective dish antenna array 108 that includes one or more antennas 110 and a plurality of adjustable coils 112 that form a projected artificial magnetic mirror (PAMM). Each adjustable coil 114 includes an inner winding section, an outer winding section and coupling circuitry (e.g., MEMs switches, RF switches, etc.). The winding sections may each include one or more turns and have the same length and/or width or different lengths and/or widths.

To adjust the characteristics of a coil 114 (e.g., its inductance, its reactance, its resistance, its capacitive coupling to other coils and/or to the metal backing 116), the winding sections may be coupled in parallel, coupled in series or used as separate coils.

With the inclusion of adjustable coils 114, a PAMM may be adjusted to operate in different frequency bands. For instance, in a multi-mode communication device that operates in two frequency bands, the PAMM of an antenna structure 106 (or other circuit structure [e.g., transmission line, filter, inductor, etc.]) is adjusted to correspond to the frequency band currently being used by the communication device.

In the present example shown in FIG. 16, the shape of the effective dish 108 may be changed based on a control signal from the core module. Alternatively, the focal point 118 of the effective dish 116 may be changed. The particular configuration of the adjustable effective dish antenna 116 will be driven by the particular application. A control unit interprets the particular application and generates control signals to configure the adjustable effective dish antenna 116 as desired.

Figure 17:
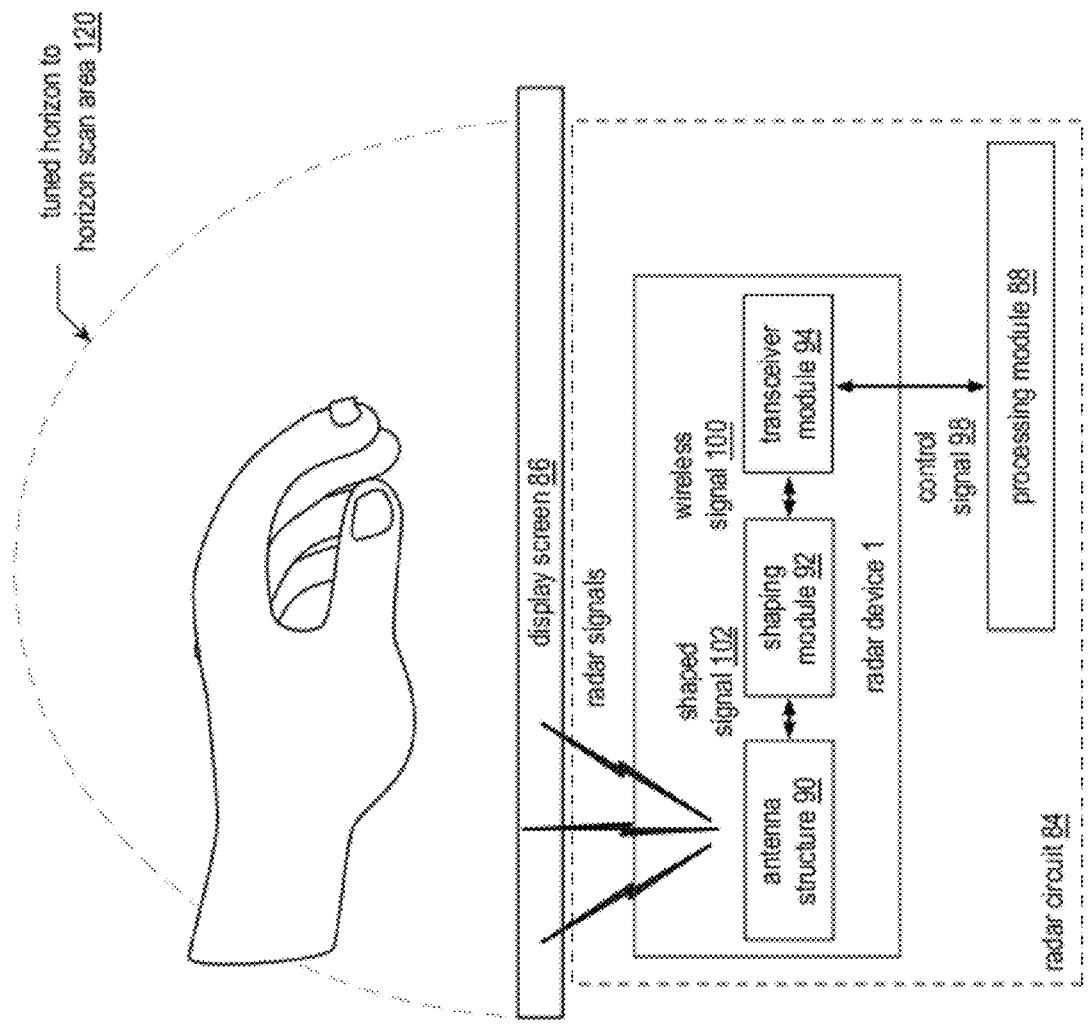
FIG. 17 is a schematic block diagram of another exemplary horizon-to-horizon radar circuit for use within a portable computing device in accordance with the present invention.

FIG. 17 is a schematic block diagram of another exemplary horizon-to-horizon radar circuit 84 for use within a portable computing device. As in FIG. 15, the horizon-to-horizon RF radar circuit (radar circuit) 84 includes one or more radar devices and a processing module 88. The radar device includes an antenna structure 90 that includes a projected artificial magnetic mirror (PAMM), a shaping module 92 and a transceiver module 94. In FIG. 17, the antenna structure 90 is adjustable to tune the horizon-to-horizon scanning area 120 to enable coverage of a three-dimensional area roughly bound by the x-y dimensions of the touchscreen. For example, in one embodiment, the antenna structure 90 may be an adjustable effective dish antenna array, as shown in FIG. 16. However, in other embodiments, other antenna structures 90 may be used to tune the scanning area 120 of the horizon-to-horizon radar device. Such tuning may also be performed by adjusting the shaped signals 102 produced by the shaping module 92.

Figure 18:
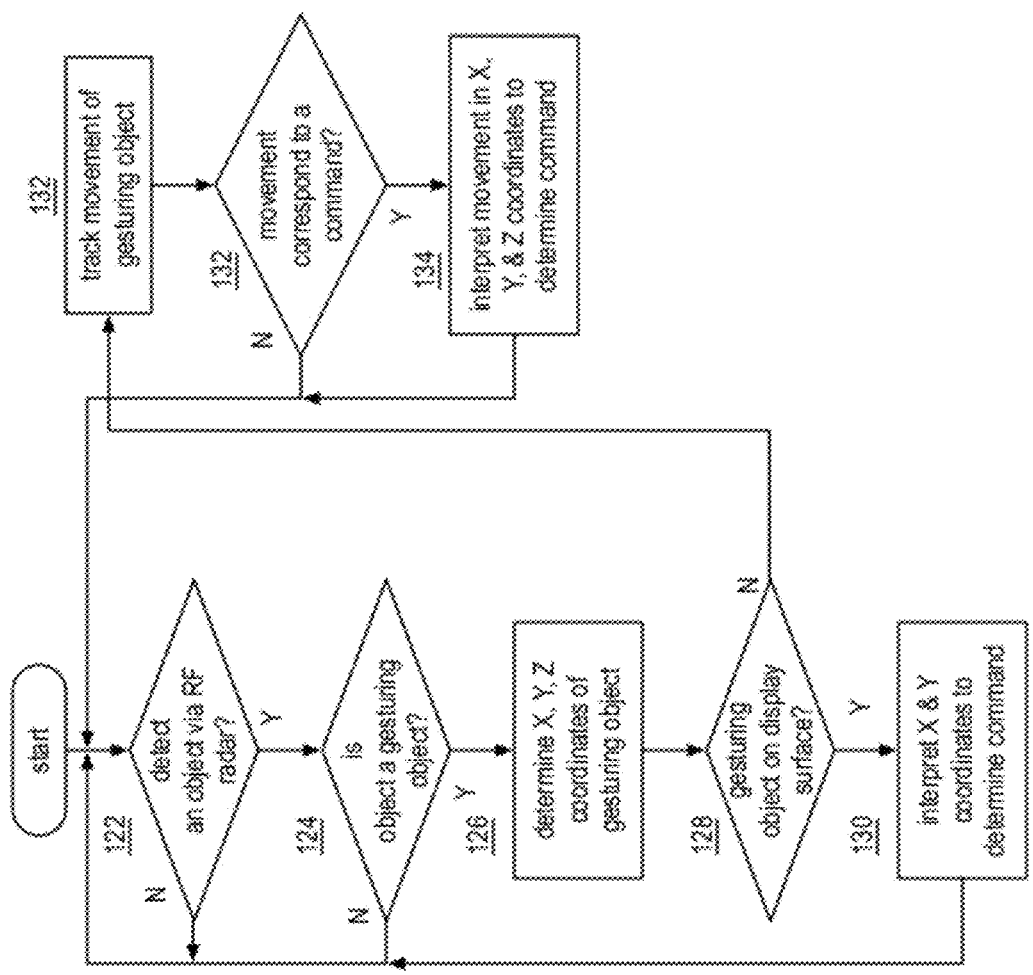
FIG. 18 is a logic diagram of an embodiment of a method of operation of a three-dimensional touchscreen of a portable computing device in accordance with the present invention.

FIG. 18 is a logic diagram of an embodiment of a method of operation of a portable computing device that begins with the RF radar processing module determining whether an object has been detected via RF radar 122. For example, the RF radar processing module may receive input from one or more RF radar circuits indicating that an object has been detected via RF radar. If yes, the method continues by determining whether the object is a gesturing object (e.g., a user controlled object, such as a finger, hand or stylus) 124. If yes, the RF radar processing module determines the location (three-dimensional (x, y, z) coordinates) of the gesturing object 126.

In embodiments in which horizon-to-horizon radar is used, the RF radar processing module then determines whether the gesturing object is located on the display surface 128. If yes, the processing module interprets the x, y coordinates of the gesturing object to determine a particular command or other user input 130. If the gesturing object is not on the display surface, the method continues with the RF radar processing module tracking movement of the gesturing object using one or more mechanisms, such as Doppler tracking and location tracking 132. The method then continues by determining whether the movement corresponds to a particular command or other user input 132. If yes, the method continues by the processing module interpreting the movement to determine the particular command or other user input 134.

Figure 19:
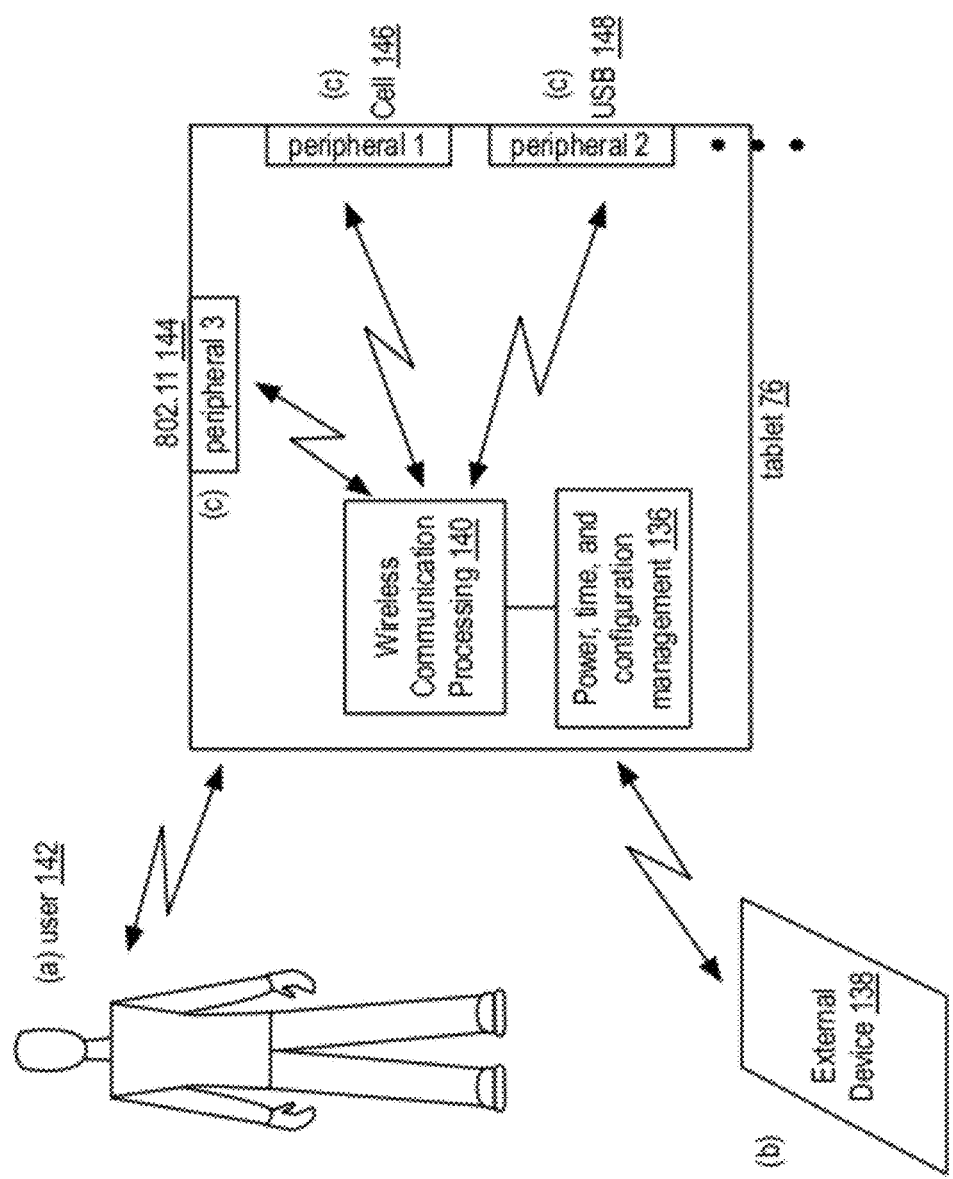
FIG. 19 is a diagram of an embodiment for managing resources within a portable computing device in accordance with the present invention.

FIG. 19 is a diagram of an embodiment for managing resources within a portable computing device 76. The portable computing device 76 includes a power, time and configuration management module 136 that optimizes the resources within the portable computing device 76 to service a user 142 that may be performing three-dimensional gesturing, one or more external devices 138 communicating wirelessly with the portable computing device 76 and internal peripheral devices requiring access to various resources. For example, various internal peripheral devices (e.g., internal peripheral devices providing IEEE 802.11 144 access to external devices/peripherals, cellular access 146 to external devices/peripherals and USB access 148 to external devices/peripherals) may each require resources of the wireless communication processing module 140 to communicate with one or more external devices/peripherals.

The management module 136 may configure and/or enable various circuits within the processing module and/or one or more of the multi-mode RF units utilizing hardware switches, software, and/or reprogrammable firmware. Accordingly, the management module 136 may turn off circuits that are not needed at a particular time to reduce their power consumption. In addition, the management module 136 determines which circuits to enable for the various applications being run and at what levels (e.g., supply voltage, clock rate, data rate, etc.). One more embodiments and/or examples of managing resources of the portable computing device 76 will be discussed in one or more of the subsequent figures.

Figure 20:
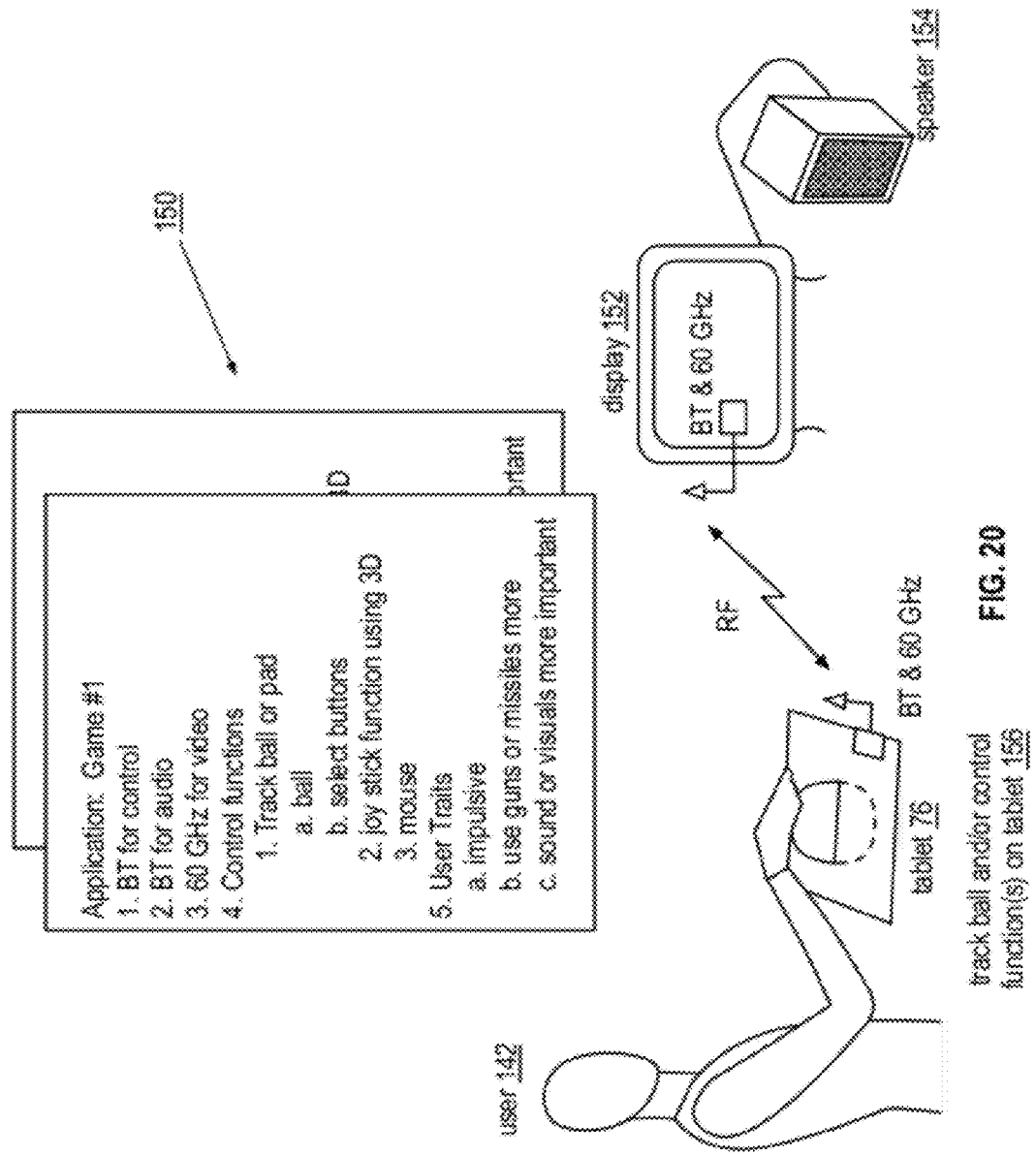
FIG. 20 is a diagram illustrating exemplary functionality and operations of a portable computing device utilizing priority look-up tables in accordance with the present invention.

FIG. 20 is a diagram illustrating exemplary functionality and operations of a configurable portable computing device. In FIG. 20, the portable computing device 76 is configurable based on a particular application running on the portable computing device 76. For example, various device features, application features and wireless communication features may be turned on or off. The portable computing device 76 may be pre-configured, automatically configurable and/or configurable by a user 142 for a particular application.

To prevent reconfiguration each time a particular application is running, the portable computing device 76 can maintain a user interface priority look-up table 150 for one or more applications on the portable computing device 76. For example, a user interface priority look-up table 150 can be configured for cell phone applications, Internet access applications, gaming applications, book applications and any other application on the portable computing device 150. Each user interface priority look-up table 150 maintains user interface preferences for a particular application that can enable the portable computing device 76 to effectively manage resource usage while the application is running. Preferences can be set by the user 142 or automatically populated based on the application, portable computing device 76 and/or network settings. Examples of user interface preferences include display (audio/visual) preferences, control preferences and user traits.

For example, one or more external devices, such as an external display device 152 and/or speakers 154 may be automatically discovered by the portable computing device 76 via a wired and/or wireless plug-and-play operation. When executing a particular application, the audio/visual components typically transmitted/displayed by the internal speakers/display of the portable computing device 76 can be switched to or mirrored to an external display device 152 and/or speakers 154. The portable computing device 76 may automatically select a particular external display device 152 and/or speakers 154 or enable the user 142 to select the particular external display device 152 and/or speakers 154. The priority look-up table 150 can indicate whether external display devices 152 and/or speakers 154 are enabled for this application, the identity of the external display devices 152 and/or speakers 154 and the type of connection to be utilized for communication with each external display device 152 and/or speaker 154. A single external display device 152 and/or speaker 154 can be included in the priority table 150, multiple display devices 152 and/or speakers 154 can be indicated for simultaneous use in the priority table 150, or a list of display devices and/or speakers ranked according to preference or location of the user can be provided in the priority look-up table 150.

Communication with the external display device 152 and/or speakers 154 may be via a wired connection and/or one or more wireless connections. For example, as shown in FIG. 20, the portable computing device 76 is using a Bluetooth wireless connection for the audio components and control commands and a 60 GHz wireless connection for the video components. Both the Bluetooth and 60 GHz wireless connections may be between the portable computing device 76 and the external display device 152 or the speaker 154 may have its own Bluetooth transceiver to communicate separately with the portable computing device 76. The priority look-up table 150 is populated with data indicating that a Bluetooth wireless connection is to be used for the audio components and a 60 GHz wireless connection is to be used for the video components.

The priority look-up table 150 may also include control preferences indicating the type of controls (user input devices) for the application. In FIG. 20, various user input devices within the portable computing device are utilized for control functions 156. More specifically, a track ball or pad is used for certain control functions 156, RF radar is used for three-dimensional joystick functions and a mouse is used for other control functions 156.

The portable computing device 76 and/or application may further contain software that "learns" user traits (preferences, behaviors, etc.) during execution of the particular application. For example, as shown in FIG. 20, for Game Application #1, the user 142 is impulsive, uses either guns or missiles more and considers either sound or visuals more important. These user traits are stored in the look-up table 150 and then converted into application and/or portable computing device settings to maximize the user's experience while playing the game (or executing another application). For example, if sound is more important to the user, the portable computing device 76 may select surround sound speakers within the location of the portable computing device 76 to transmit the audio, whereas if visuals are more important to the user, the portable computing device 76 may select internal speakers of a television or a center channel in a location of the portable computing device 76 to transmit the audio.

Note that other user interface preferences can also be included in the priority look-up tables 150. In addition, multiple tables can be created for each application, so that a separate look-up table 150 can be provided for each user 142, for one or more application modes, for different times of day or days of week or other application usages. Furthermore, priority levels can be assigned between tables of an application, such that a particular priority look-up table 150 is a default priority table for the application and other priority tables 150 are not used unless requested by the user 142 or other factors indicate that a different priority table 150 should be used.

Priority levels can also be assigned to priority look-up tables 150 for different application types. For example, a priority look-up table 150 may indicate that for wireless communication, cellular communication is preferred over Wi-Fi communication. Therefore, the portable computing device 76 may search for a cellular network to connect a wireless call first and then search for a Wi-Fi network if no cellular network can be found. In addition, a separate priority look-up table 150 can be created that prioritizes applications running simultaneously on the portable computing device 76. For example, a priority look-up table 150 may indicate that cell phone calls have priority over gaming applications. In this way, resources can be allocated to those applications that are the most important (and hence have the highest priority).

FIG. 21 is a logic diagram of an embodiment of a method of building a priority look-up table for use within a portable computing device that begins with a default look-up table for a particular application that can be populated with preferences to create a modified priority look-up table for that particular application 158. The method then proceeds to determine an application type for the application 160 and assigns the application type to the priority look-up table 172. The method then proceeds to assign a particular user or a default user and any user traits 162 to the priority look-up table 172. Based on the application type and user associated with the priority look-up table and any additional user inputs, the method then proceeds to determine the user interface control preferences for the application 164. Audio 166 and visual 168 preferences for the application are assigned next, followed by any communication device preferences 170 (e.g., Wi-Fi, cellular, etc.). Note that additional preferences can also be assigned to the priority look-up table, depending on the application and intended usage of the portable computing device when running the application. The assigned preferences are input into the priority look-up table and stored for any subsequent executions of the application. Preferences may be modified at any time, based on user input or changes in device/application/network settings.

FIG. 22 is a diagram illustrating an exemplary priority look-up table for use within a portable computing device. A default priority look-up table 174 for a particular application can be provided with the application or determined by the portable computing device based on application/device/network settings. For example, as shown in FIG. 22, the default priority look-up table 174 for Game #1 indicates that a Bluetooth wireless connection is used for control commands, internal speakers within the portable computing device are used for audio, a Wireless Local Area Network (WLAN) connection is used for video, a mouse is used for control functions (user input device) and no user traits are listed.

Modifications to the default priority look-up table 174 can be made automatically (e.g., based on history (user selections/input while playing the game), other applications running at the same time and/or user experience) or user input to produce an updated priority look-up table 176. For example, the default priority look-up table 174 can be modified to indicate that a Bluetooth wireless connection is used for both control commands and audio, a 60 GHz wireless connection is used for video, various input devices (track ball or pad, three-dimensional RF radar and mouse) are used for control functions and several user traits are applied.

FIG. 23 is a diagram illustrating another exemplary priority look-up table for use within a portable computing device. The priority look-up table shown in FIG. 23 indicates the priority levels for particular applications 178. For example, a cell phone application may have priority over an Internet application, which has priority over a gaming application, which has priority over a music playback application. Thus, when multiple applications are running concurrently, the portable computing device can use the priority level look-up table 178 to determine which applications to prioritize for resource usage.

Figure 24:
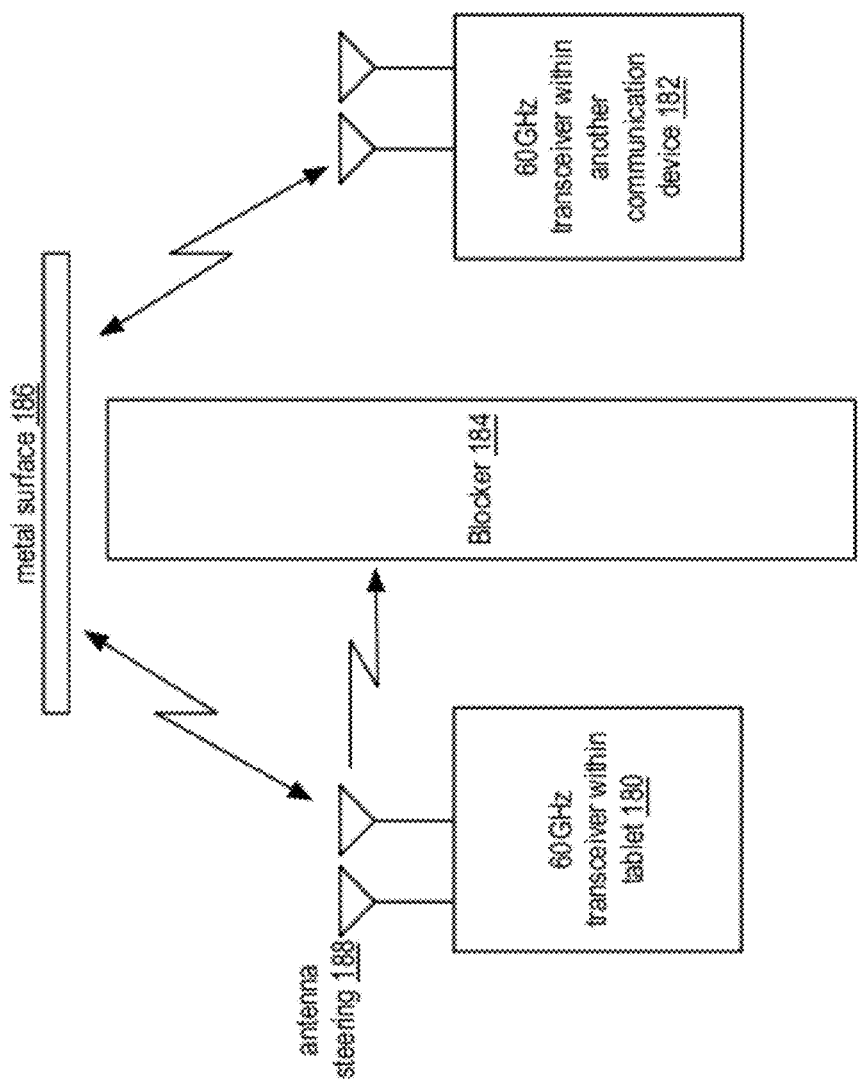
FIG. 24 is a diagram of another embodiment of a portable computing device utilizing high speed data communication relaying in a communication environment in accordance with the present invention.

FIG. 24 is a diagram of another embodiment of a portable computing device 180 and/or 182 utilizing high-speed data communication relaying in a communication environment. In embodiments in which the portable computing device is wirelessly communicating with another communication device using extremely high frequencies, such as the 60 GHz Wi-Fi frequency band, signals transmitted between the devices may be blocked by obstructions in the transmit path. For example, a user may be playing a game on the portable computing device and one of the multimode RF units may be configured to wirelessly communicate (via a 60 GHz link) the visual components of the game to a television for display thereon, while one or more other multimode RF units are configured for 3D RF radar to provide a joystick (controller) function for the game. If another person (who may be another player in the game) is positioned between the portable computing device and the television, that person may at least partially block the 60 GHz video signals from being transmitted from the portable computing device to the television, potentially causing an interruption in the game.

When a blocker 184 is present that inhibits a direct (line of sight) path between the devices, the devices can search for an indirect (or relay) path that reflects the 60 GHz signals off of nearby surfaces 186 to circumvent the blocker 184. However, at such extremely high frequencies, signals may not be easily reflected off many surfaces. Therefore, to increase the signal strength at the receiver 182, a reflective surface, such as a metal surface 186, may be used to facilitate reflection of the signals, and effectively provide a relay path around the blocker 184. In addition, the transmitter and receiver antennas may further be configured (i.e., adjust their transmission and/or reception radiation patterns) to steer the transmitted signals towards the metal surface 186 and to receive signals reflected off the metal surface 186 using a beam-steering or beamforming 188 technique.

As an example of operation, the core module detects a blocker that is adversely affecting the high-speed data communication (e.g., a 60 GHz communication). Such a detection may be done by determining a low received signal strength indicator, a missed response to a query, etc. When the blocker is detected, the core module determines whether a radiation pattern alternative for the high-speed data communication will reduce the adverse affects on the high-speed data communication (e.g., can the transmission signal and/or reception signal be steered around the blocker).

When the radiation pattern alternative for the high-speed data communication will reduce the adverse affects on the high-speed data communication, the core module enables the radiation pattern alternative (e.g., sends a control signal regarding changing the radiation pattern). Note that changing the radiation pattern may include adding and/or deleting an MM RF unit from the one or more MM RF units as well as including beamforming operation, power boost, alternating direction of the radiation pattern, etc. Upon receiving an indication of the radiation pattern alternative, the one or more multi-mode RF units adjust at least one of transmission and reception of the high-speed data communication in accordance with the radiation pattern alternative. For instance, adjusts the radiation pattern of a shared transmit/receive antenna, adjusts the radiation pattern of a transmit antenna, and/or adjusts the radiation pattern of a receive antenna.

Figure 25:
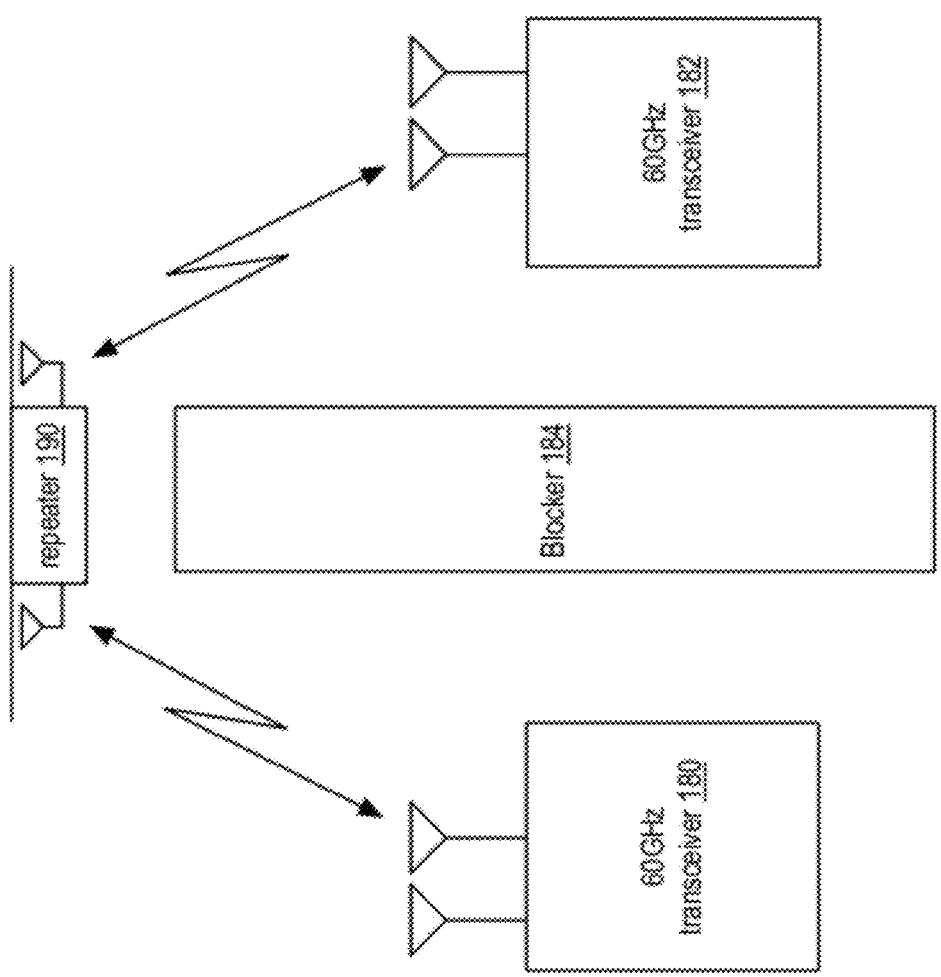
FIG. 25 is a diagram of another embodiment of a portable computing device utilizing a repeater to provide high speed data communication relaying in a communication environment in accordance with the present invention.
Figure 26:
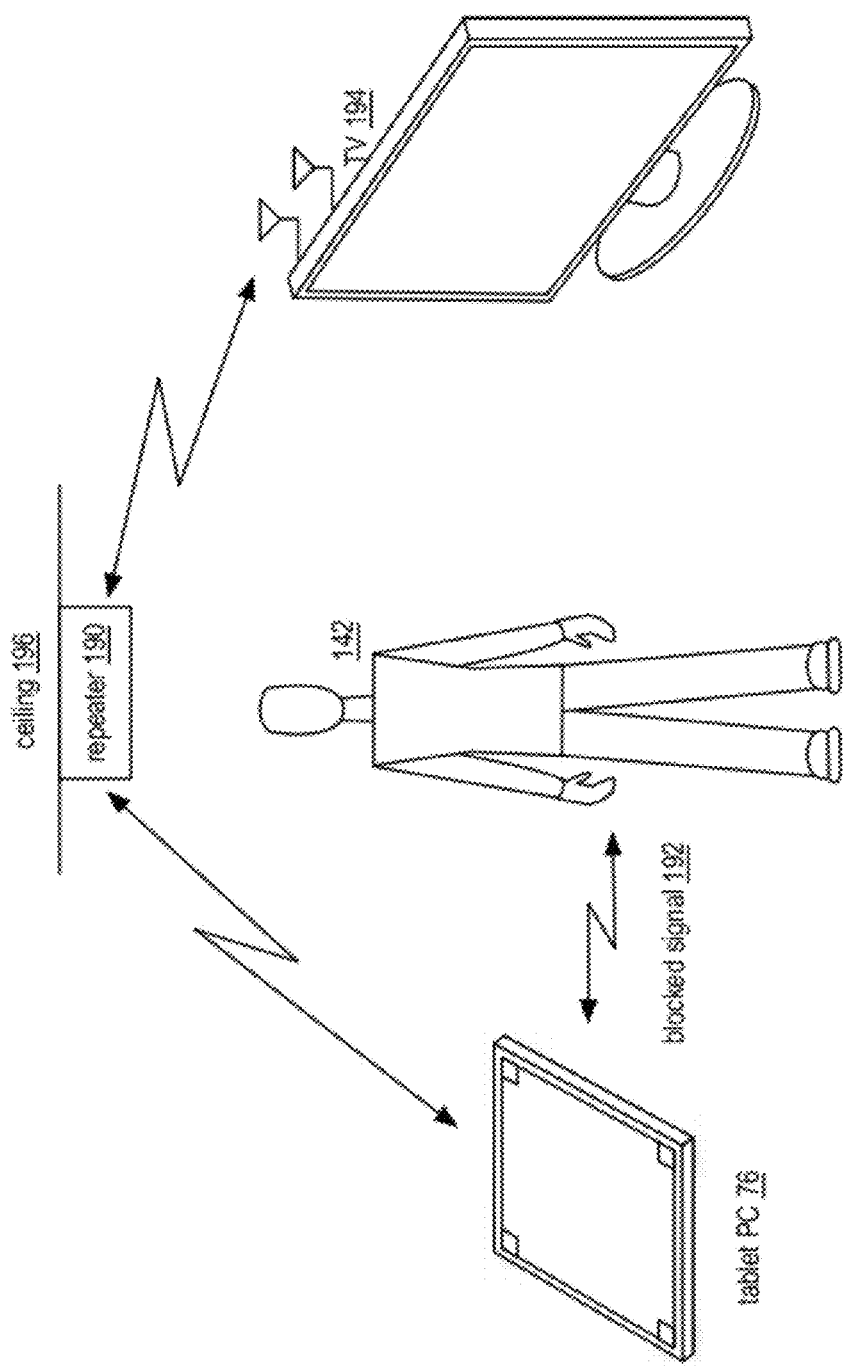
FIG. 26 is a diagram of an example of a portable computing device utilizing a repeater to provide high speed data communication relaying in accordance with the present invention.

In another embodiment, as shown in FIG. 25, high speed data communication relaying can be achieved using a repeater 190 instead of, or in addition to, a reflective surface. The repeater 190 may a stand-alone repeater or another communication device functioning as a repeater. For example, as shown in FIG. 26, the portable computing device 76 can include a multi-mode RF unit with a phased array antenna operable to form a beam towards the repeater 190 to enable wireless communication between the portable computing device and a television while one or more blockers (such as the user 142) are present between the portable computing device 76 and television 194. The repeater 190 may be positioned, for example, on a ceiling 196 within a room containing the portable computing device 76 and television 194.

Figure 27:
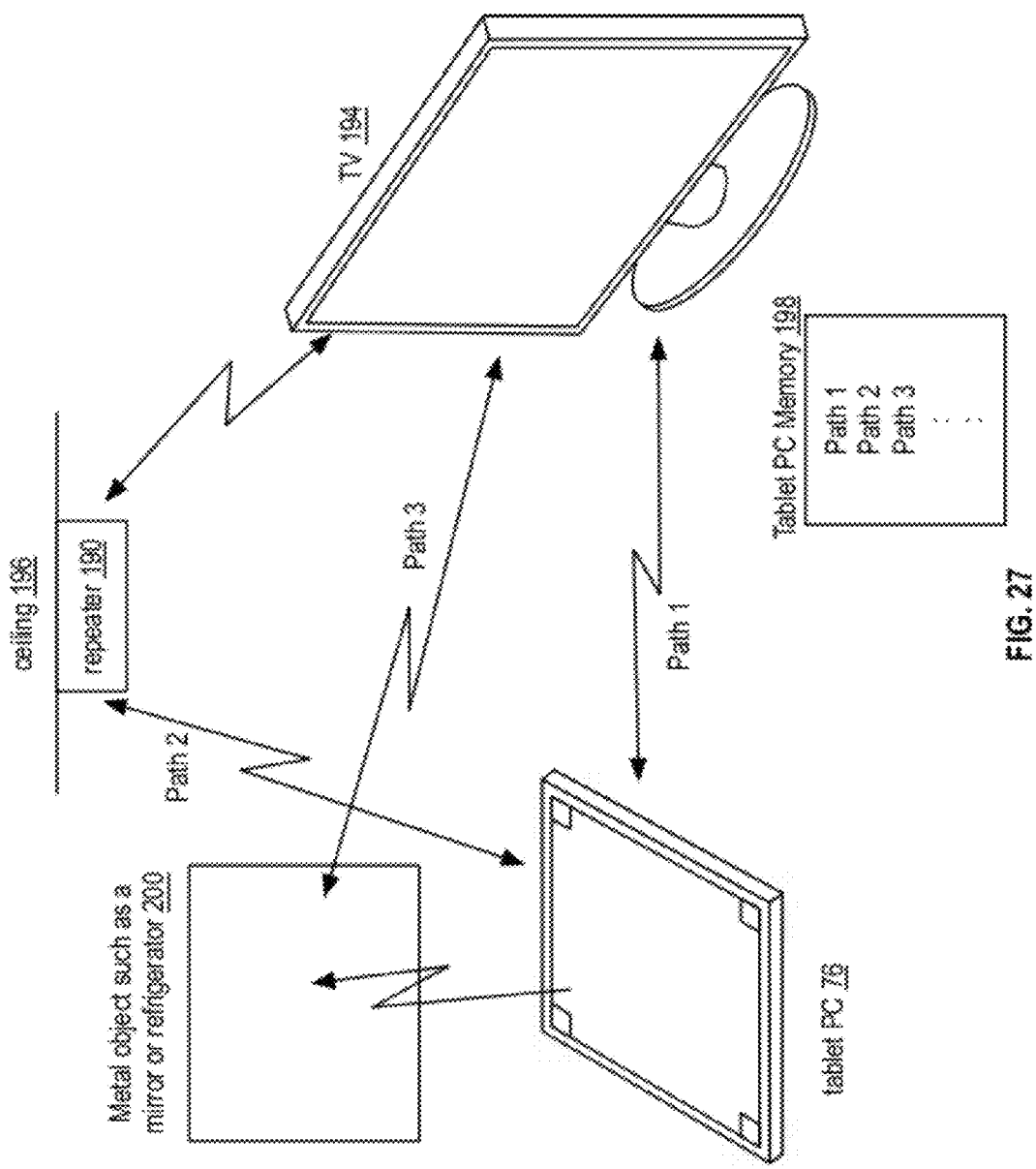
FIG. 27 is a diagram of another example of a portable computing device utilizing multiple sources to provide high speed data communication relay in accordance with the present invention.

In another example, as shown in FIG. 27, high-speed data communication relay can be achieved using multiple relay sources. In a communication environment in which one or more repeaters 190 and/or one or more reflective surfaces 200 are available, the portable computing unit 76 may select from the available relay sources to transmit and receive signals from another communication device (television) 194. Each relay source provides a path between the portable computing device 76 and the television 194, and the portable computing device 76 may maintain information on each path, including a direct path, in an internal memory 198 for use in selecting one of the paths for a particular communication. For example, the portable communication device 76 may attempt to communicate with the television 194 using the direct path first, and upon determining that one or more blockers are present in the direct path, switch to an available relay path by steering the phased array antenna toward the particular relay source. The relay paths may be prioritized according to quality (e.g., bit error rate, signal to noise ratio or other quality measurement) and/or signal strength/amplitude.

Figure 28:
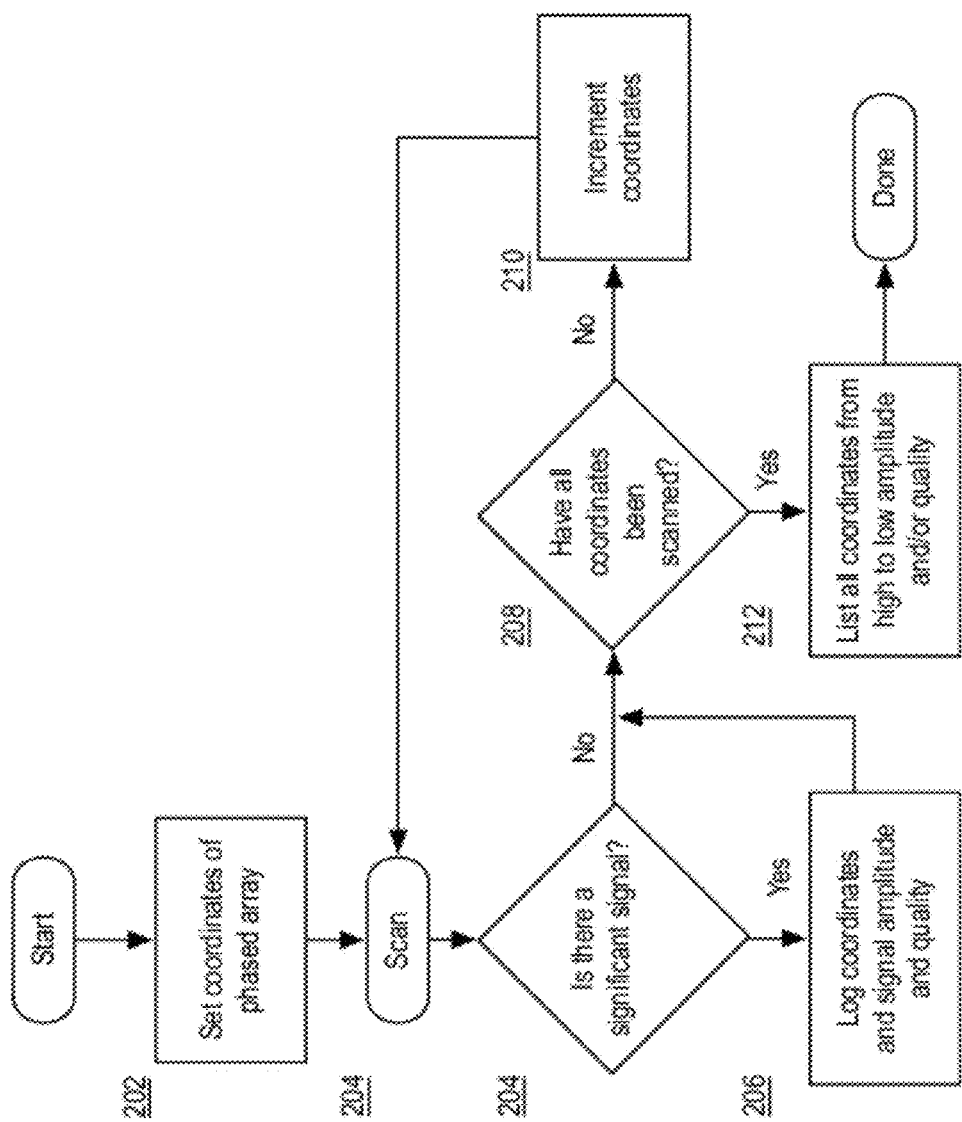
FIG. 28 is a logic diagram of an embodiment of a method of a portable computing device to build a prioritization table for high speed data communication paths in accordance with the present invention.

FIG. 28 is a logic diagram of an embodiment of a method of a portable computing device to build a prioritization table for high-speed data communication paths that begins with the portable computing device setting coordinates of the phased array antenna to establish a direct wireless communication path with another communication device 202. The method continues with the portable computing device scanning for received signals in the desired frequency range (e.g., the extremely high frequency band) via the direct path 204.

If a significant signal is received 204, the method continues with the portable computing device logging the coordinates, signal amplitude and quality of the received signal for the direct path 206. If not, the method continues with the portable computing device determining if all coordinates have been scanned 208, and if not, incrementing the coordinates and repeating the scan to log coordinates, along with the respective signal amplitude and quality of potential relay paths 210. Once all coordinates have been scanned, the method continues with the portable computing device sorting all logged coordinates by amplitude/quality to create a list of coordinates from high amplitude/quality to low amplitude/quality 212. Having created the list, which includes a plurality of radiation pattern alternatives for the high-speed data communication, the core module may select one of them as the radiation pattern alternative based on a desired level of communication (e.g., desired error rate, desired transmit power, etc.).

Figure 29:
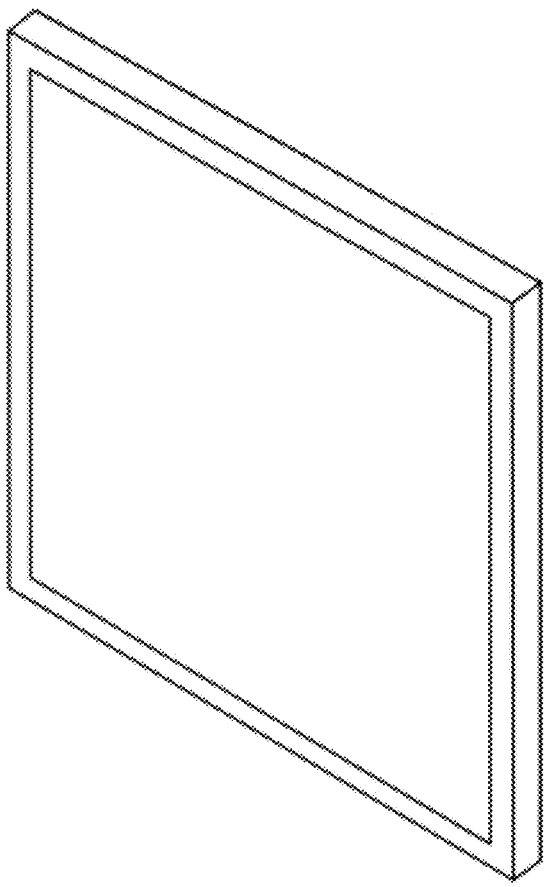
FIG. 29 is a schematic block diagram of an embodiment of hermetically sealed portable computing device in accordance with the present invention.

FIG. 29 is a schematic block diagram of an embodiment of hermetically sealed portable computing device 174. The hermetically sealed (airtight) portable computing device 174 has no passive buttons, connectors or switches, which reduces the cost of the portable computing device. In addition, hermetically sealing the portable computing device increases the life and improves the reliability of the device by minimizing or eliminating the exposure of internal circuits to water vapor and other undesired substances. Since no buttons are present on the surface to turn on the device, other power up mechanisms can be used. By way of example, but not limitation, such power up mechanisms can include shaking the device, touching the device (device senses touch or heat) or tipping the device.

In addition, without a connector to couple the portable computing device to a power source, the portable computing device 214 may be configured to receive wireless power to charge the portable computing device. For example, the portable computing device 174 may include a wireless power receiver (or battery) for wirelessly coupling to, for example, a charge mat or resonant induction recharger, and a wireless power conversion module that operates using a wireless power conversion tone or a wireless power conversion frequency band. If a wireless power conversion tone is used, a DC-DC converter may be provided to generate one or more supply voltages from the wireless power receiver and also to generate a wireless power conversion signal at a frequency corresponding to the wireless power conversion tone. For example, the wireless power conversion signal may correspond to a voltage induced in a secondary winding of a transformer within the DC-DC converter. The power conversion signal may be transmitted throughout the portable computing device and to the multi-mode RF units via the RF link.

If a wireless power conversion frequency band is used, one or more DC-DC converters may generate a plurality of wireless power conversion signals at different frequencies. Each of the wireless power conversion signals may correspond to a different voltage level or may be individually created for different modules within the portable computing device 174. For example, a respective one of the plurality of wireless power conversion signals within the wireless power conversion frequency band may be transmitted to each of the multimode RF units.

Figure 30:
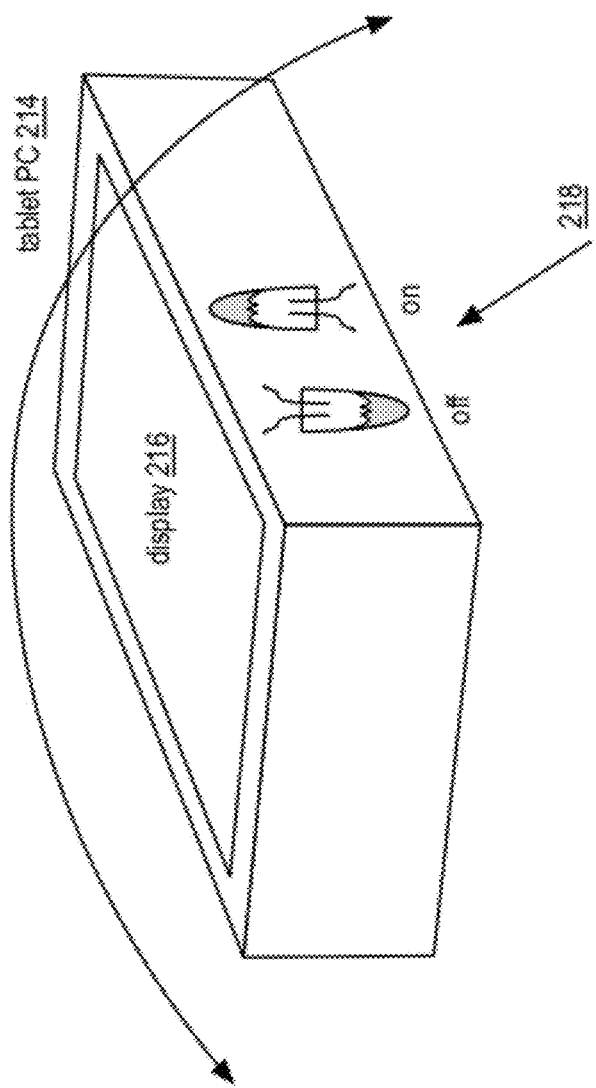
FIG. 30 is a diagram illustrating an exemplary power up operation of a hermetically sealed portable computing device in accordance with the present invention.

FIG. 30 is a diagram illustrating an exemplary power up operation of a hermetically sealed portable computing device 214. In FIG. 30, two mercury switches 218 are included within the portable computing device 214. The mercury switches 218 allow or interrupt the flow of electric current in a power up circuit in a manner that is dependent upon the switch's alignment relative to the direction of the pull of the Earth's gravity. For example, one mercury switch 218 may sense when the device 214 is turned face up (display 216 side up), while the other mercury switch 218 may sense when the device 214 is turned face down (display 216 side down). In order to activate a power up circuit for the portable computing device 214, both mercury switches 218 may need to be turned on. Therefore, the user would have to turn the portable computing device 214 face down and then face up to power up the portable computing device 214. Note that the mercury switches 218 could be oriented within the portable computing device 214 to require a different sequence of positions of the portable computing device 214 with respect to gravity (i.e., turned on one side and then the other). In other embodiments, a single mercury switch 218 or multiple mercury switches 218 could be used to power up the device 214.

Figure 31:
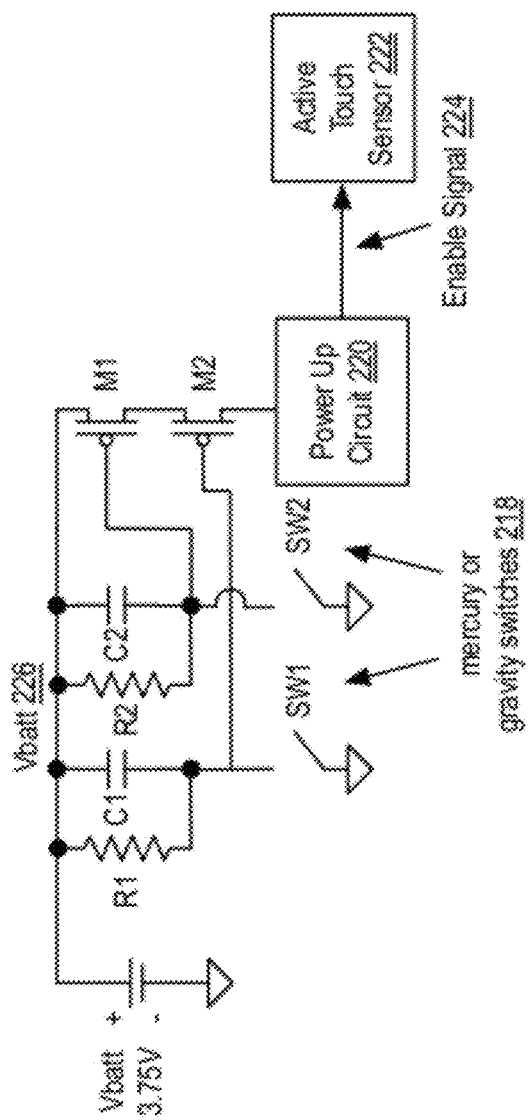
FIG. 31 is a diagram illustrating an exemplary power up circuit for use within a hermetically sealed portable computing device in accordance with the present invention.

FIG. 31 is a diagram illustrating an exemplary power up circuit for use within a hermetically sealed portable computing device. The power up circuit 220 includes mercury switches 218 SW1 and SW2, transistors M1 and M2, capacitors C1 and C2, resistors R1 and R2, battery Vbatt 226 and active touch sensor 222. The two mercury switches 218 SW1 and SW2 are mounted in the portable computing device such that the device has to be turned one direction (i.e., face down) and then another direction (i.e., face up) to turn on both transistors M1 and M2. If switches SW1 and SW2 are turned on within a short period of each other (determined by the RC constant), the gates of M1 and M2 will be near ground, supplying power to the power up circuit 220. While resistors R1 and R2 are discharging capacitors C1 and C2 to battery Vbatt 226, an active touch sensor 222 (i.e., capacitive touch sensor) is enabled 224, thereby allowing the user to initiate a final power up command. The active touch sensor 222 may be on the frame of the portable computing device or part of the touchscreen on the display. Requiring the user to actively power up the device by touching the power up sensor prevents unintended power up of the portable computing device by simple movement of the device.

Figure 32:
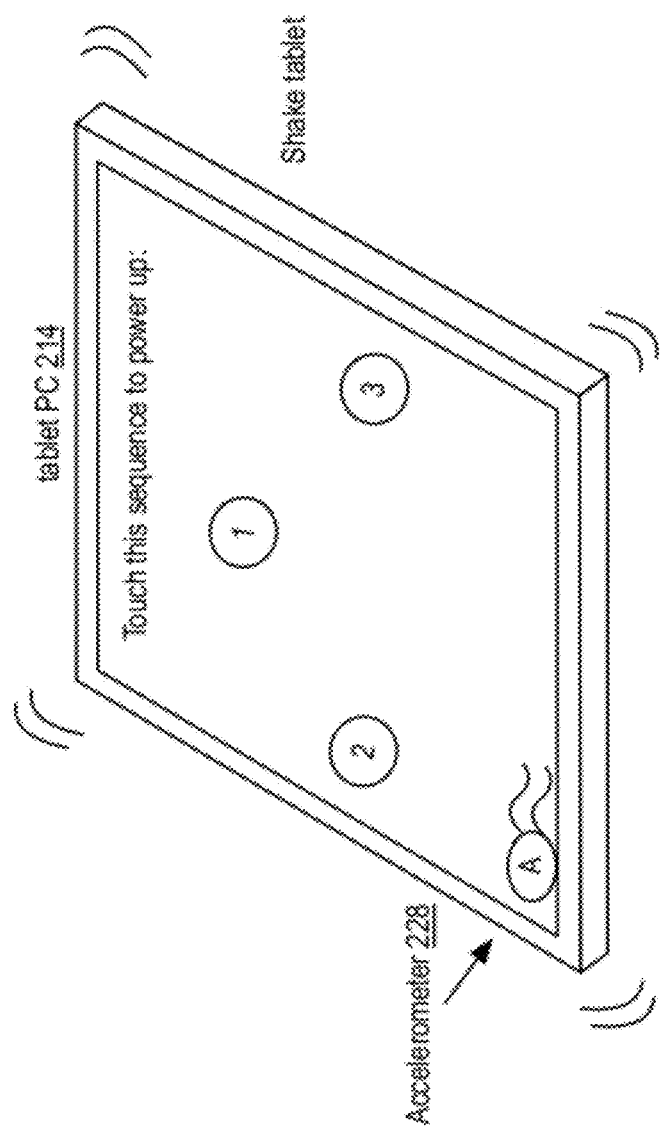
FIG. 32 is a diagram illustrating another exemplary power up operation of a hermetically sealed portable computing device in accordance with the present invention.

FIG. 32 is a diagram illustrating another exemplary power up operation of a hermetically sealed portable computing device 214. Instead of using mercury switches, one or more accelerometers 228 can be included within the portable computing device 214 to detect when the device shaken or rolled. Low power accelerometers 228 could be utilized to minimize power consumption by the accelerometers 228 while the device 214 is not in use. To prevent unintended power up and/or to provide device security, as in FIG. 31, one or more touch sensors could be activated to confirm power up. For example, upon shaking or rolling the device, the user could be presented with a screen requesting a particular touch sequence on the device display to power up the device 214.

Figure 33:
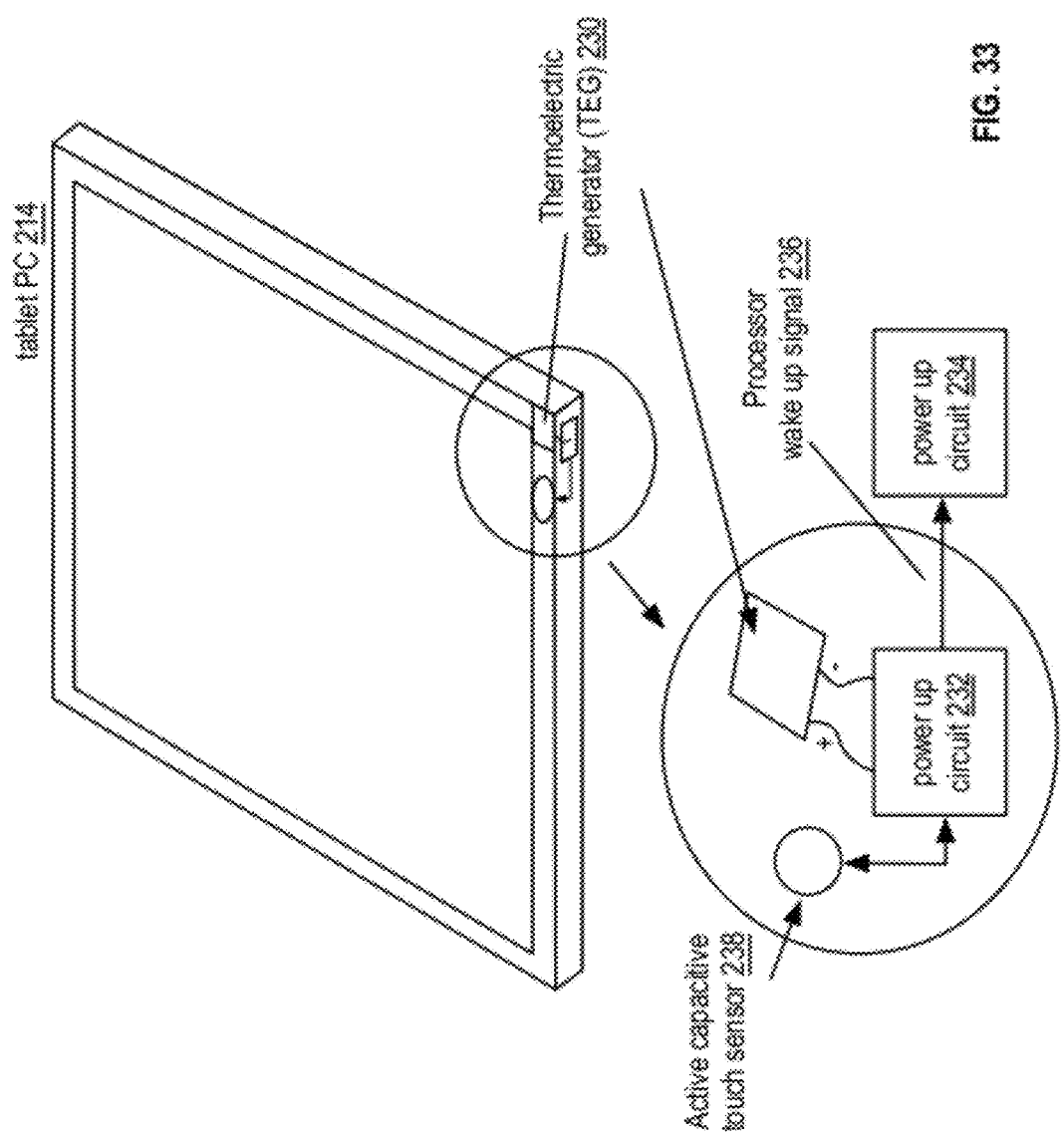
FIG. 33 is a diagram illustrating another exemplary power up operation within a hermetically sealed portable computing device in accordance with the present invention.

FIG. 33 is a diagram illustrating another exemplary power up operation within a hermetically sealed portable computing device 214. In FIG. 33, a thermoelectric generator (TEG) 230 is included within the portable computing device 214 to power up the device 214. The TEG 230 is a thermoelectric touch device that converts the heat applied by a user's fingertip or thumb into electrical energy. The current generated by the TEG 230 is applied to a first power up circuit 232 to power up an active touch sensor 238. When the user touches the active touch sensor 238, a wake up signal 236 is provided to a second power up circuit 234 to power up the processing module and other components of the portable computing device 214. In other embodiments, the active touch sensor 238 is not used and the power up circuit 232 powered by the TEG 230 directly powers the portable computing device 214.

Figure 34:
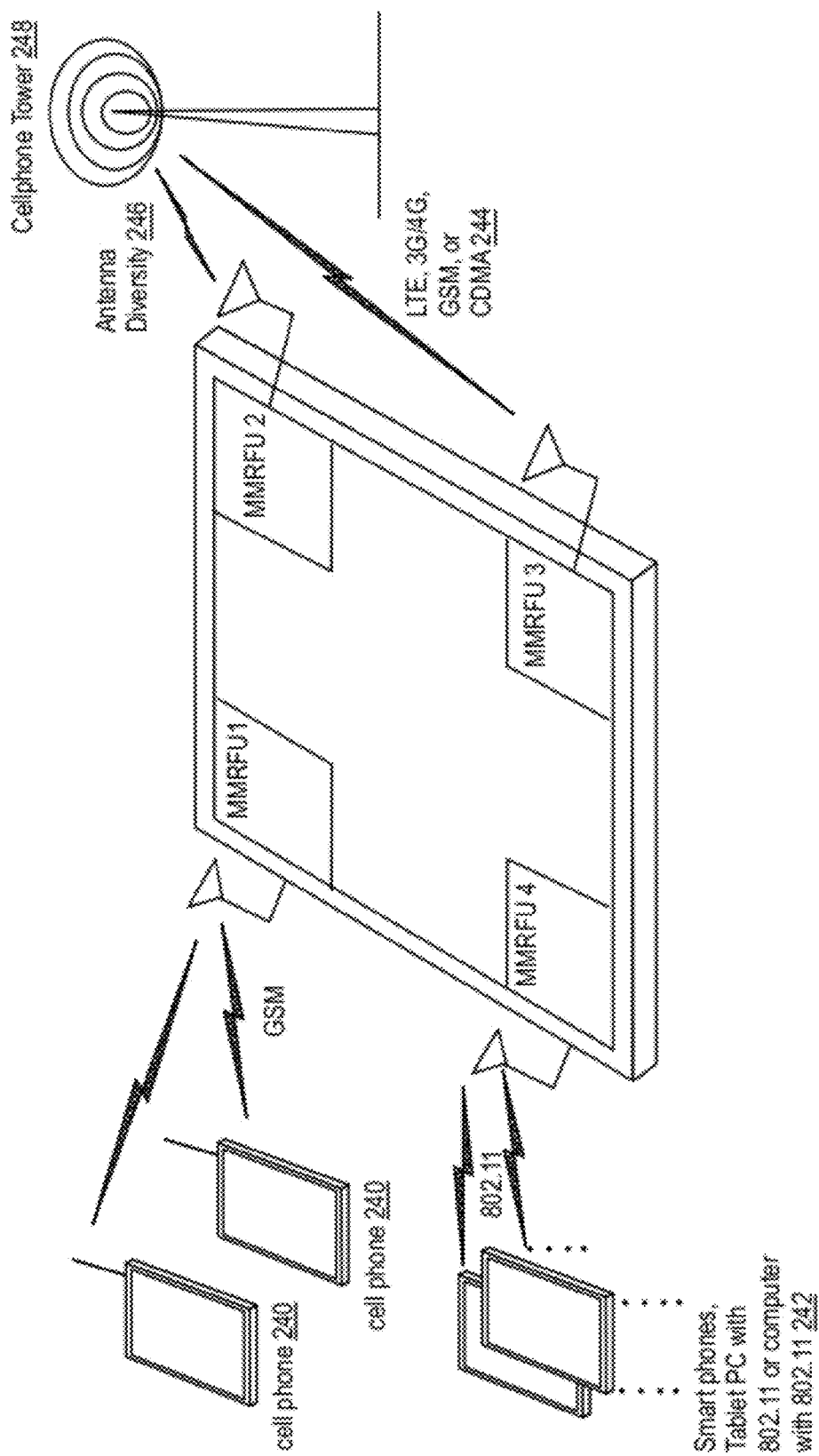
FIG. 34 is a diagram of another embodiment of a portable computing device operating as a microcell to support various communication schemes in accordance with the present invention.

FIG. 34 is a diagram of another embodiment of a portable computing device operating as a microcell to support various wireless communication schemes. The multimode RF units of the portable computing device can support multiple cell/smart phones or other communication devices 240, such as an 802.11 enabled laptop or other portable computing device 242. For example, in one embodiment, the portable computing device can configure one of the multimode RF units (MMRFU 1) to operate in accordance with a particular cellular communication scheme, for example, Global System for Mobile Communications (GSM), Universal Mobile Telecommunications System (UMTS), Long Term Evolution (LTE), Code Division Multiple Access (CDMA) or Wideband CDMA (WCDMA) 244, to facilitate a voice call between a cell phone 240 and a cellphone tower (base station) 248. As such, the portable computing device can function as a microcell or femtocell providing cellular service to a limited area.

In addition, the portable computing device can further configure additional multimode RF units (MMRFU 2 and MMRFU 3) to operate in accordance with the selected cellular communication scheme to utilize multiple antennas to communicate with the base station, thereby providing antenna diversity 246. Antenna diversity 246 can increase signal reliability by mitigating multipath fading, which is beneficial in areas that typically suffer from poor signal reliability.

In another embodiment, the portable computing device can configure one of the multimode RF units to support an 802.11 communication session for WLAN enabled services. In this embodiment, the portable computing device is functioning as a microcell or femtocell providing WLAN access to a limited area. In either embodiment, once the portable computing device establishes a subscription to the service provider (cellular or WLAN), the portable computing device may be able to provide cellular or WLAN service to communication devices that do not have a subscription to that particular service provider.

FIG. 35 is a diagram of another embodiment of a portable computing device operating as a microcell to support various communication schemes. One or more of the multimode RF units (MMRFU4) can include a large pad antenna 250 to provide sufficient power for communications with remote cellular base stations 252 or LAN wireless routers. Smaller pad antennas may be used in other multimode RF units (MMRFU1) to facilitate short range communication with communication devices 254 using, for example, Bluetooth, 802.11 or NFC (Near Field Communication).

FIG. 36 is a diagram of an exemplary pad antenna structure of a multimode RF unit within a portable computing device. The pad antenna structure includes a pad antenna 256 coupled to a transmit/receive (Tx/Rx) switch 258. When operating in a transmit mode, the pad antenna 256 provides inbound RF signals to the multimode RF unit (MMRFU4) via the Tx/Rx switch 258 and a low noise amplifier (LNA) 260. When operating in a receive mode, outbound signals are provided from MMRFU4 to the pad antenna 256 through a power amplifier (PA) 262 and the Tx/Rx switch 258.

Figure 37:
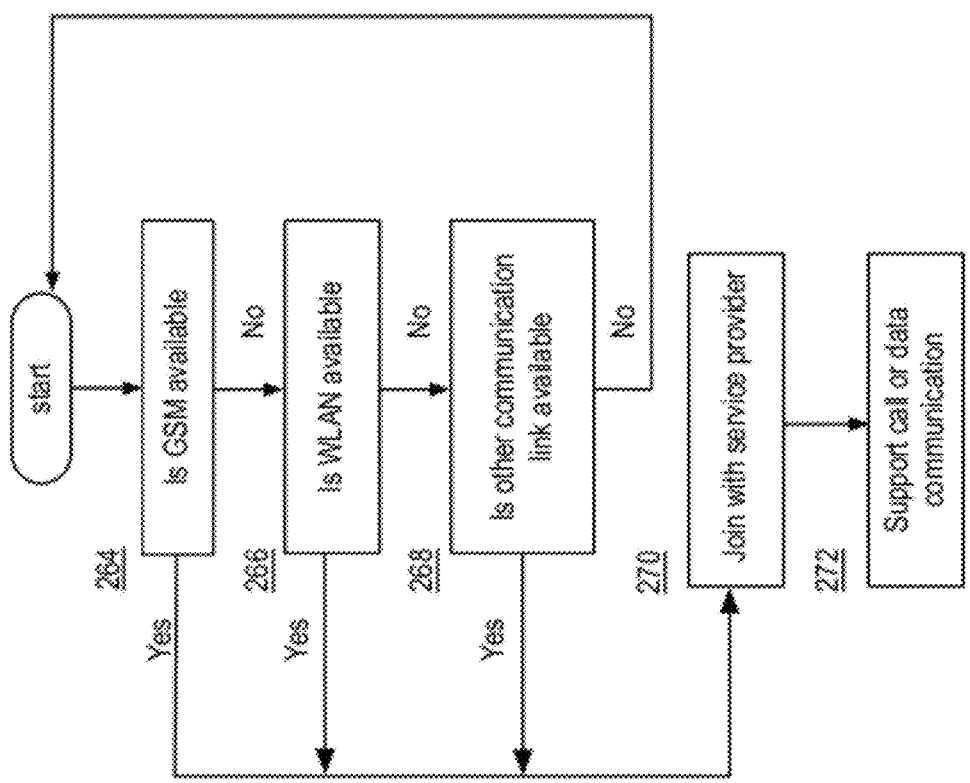
FIG. 37 is a logic diagram of an embodiment of a method of supporting various communication schemes by a portable computing device in accordance with the present invention.

FIG. 37 is a logic diagram of an embodiment of a method of supporting various communication schemes by a portable computing device that begins with the portable computing device scanning to determine whether a GSM service provider is available 264. If yes, the method continues with the portable computing device joining with the GSM service provider (i.e., registering with the GSM base station) 270 and supporting a voice call or data communication between a wireless communication device and the GSM base station 272. If no, the method continues with the portable computing device determining whether a WLAN service provider is available 266. If yes, the method continues with the portable computing device registering with the WLAN service provider 270 and supports a voice call or data communication between a wireless communication device and the WLAN 272. If no, the method continues with the portable computing device scanning for any other available wireless service provider 268. If another wireless service provider is found, the portable computing device registers with that wireless service provider 270 and supports a voice call or data communication between a wireless communication device and the wireless service provider 272. If no other wireless service provider is found, the method repeats.

Figure 38:
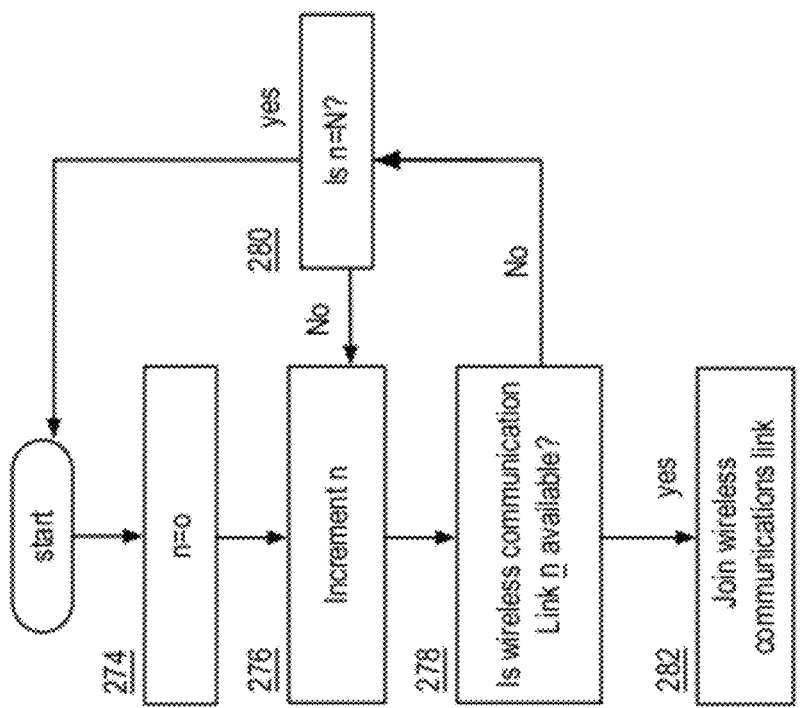
FIG. 38 is a logic diagram of an embodiment of another method of supporting various communication schemes by a portable computing device in accordance with the present invention.

FIG. 38 is a logic diagram of an embodiment of another method of supporting various communication schemes by a portable computing device that begins with the portable computing device accessing a search table containing a list (n=0 . . . n=N) of cellular service providers supported by the portable computing device 274. The portable computing device then indexes on the first entry in the table (n=1) 276 and scans for a signal from the first cellular service provider associated with the first entry (i.e., GSM) 278. If no signal is found, the method continues with determining whether n=N 280. If not, the portable computing device increments n to determine the next cellular service provider in the table 276 and scans for a signal from the next cellular service provider 278. The method repeats until an available cellular service provider is found and the portable computing device registers with that available cellular service provider 282.

Figure 39:
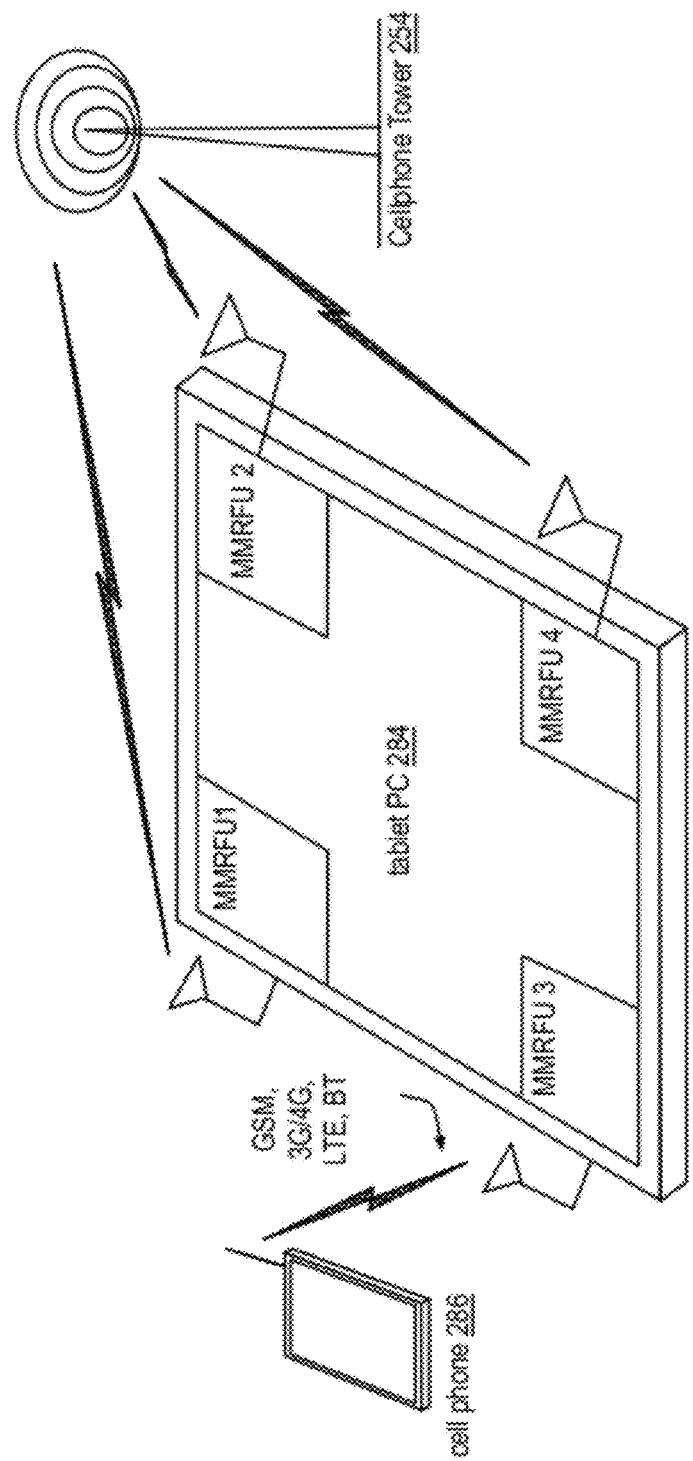
FIG. 39 is a diagram of an embodiment of portable computing device providing antenna diversity relay in accordance with the present invention.

FIG. 39 is a diagram of an embodiment of portable computing device 284 providing antenna diversity relay. As described above, antenna diversity reduces multipath fading, thereby improving signal reliability, which can result in fewer dropped calls. In embodiments in which multiple multimode RF units are configured to communicate with a cellphone tower 254, the portable computing unit 284 can utilize antenna diversity relay to support a cellular voice/data call between a wireless communication device 286 (i.e., cell phone) and the cellphone tower 252. The cell phone 286 can wirelessly communicate with the portable computing device 284 via one multimode RF unit (MMRFU3) and the portable computing device 284 can wirelessly communicate with the cellphone tower 254 via two or more additional multimode RF units (MMRFU1, MMRFU2 and MMRFU4). Thus, the portable computing device 284 can relay transmissions between the cell phone 286 and the portable computing device 284, using multiple antennas between the portable computing device 284 and the cellphone tower 254 to improve signal reliability between the cellphone tower 254 and the location of the portable computing device 284 and cell phone 286.

In one embodiment, the cell phone 286 and the portable computing device 284 can communicate using the cellular communication scheme (i.e., GSM, 3G, 4G, LTE, etc.) of the cellphone tower 254. In another embodiment, the cell phone 286 and the portable computing device 254 can communicate using a short range communication scheme (i.e., Bluetooth), while the portable computing device 284 and cellphone tower 254 communicate using the cellular communication scheme of the cellphone tower 254.

Figure 40:
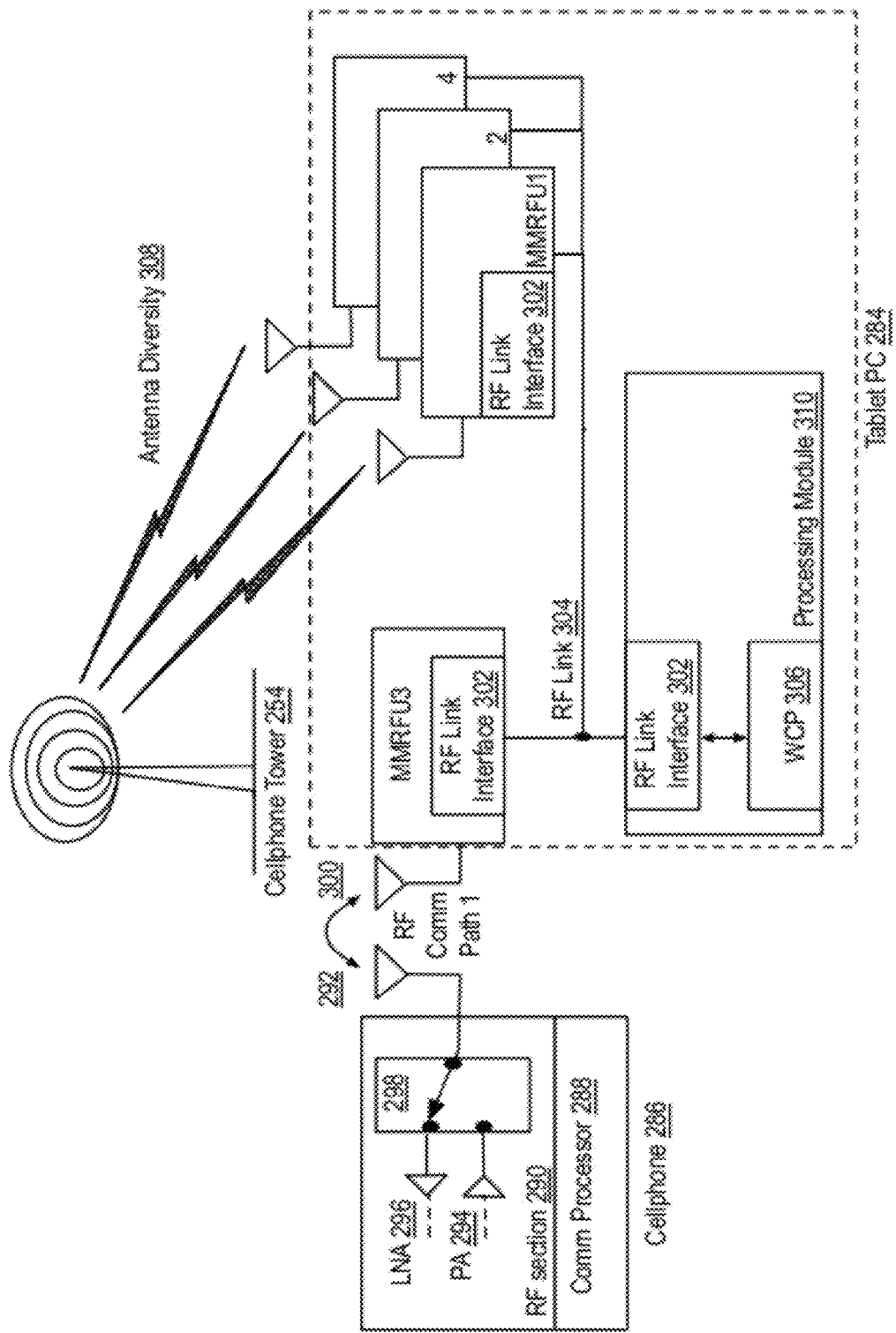
FIG. 40 is a diagram of another embodiment of a portable computing device providing antenna diversity relay in accordance with the present invention.

Communications between the cell phone 286 and cellphone tower 254 are relayed through the portable computing device 284, as shown in FIG. 40. The cell phone 286 includes a processing module 288, RF section 290 and antenna 292. The processing module 288 executes digital transmitter functions to process outbound data in accordance with the particular wireless communication scheme to produce an outbound digital signal. Digital transmitter functions may include, but are not limited to, scrambling, encoding, constellation mapping, and/or modulation. The outbound digital signal is provided to a digital-to-analog converter (not shown) to convert the outbound digital signal from the digital domain to the analog domain to produce an outbound analog baseband (or low IF) signal. The RF section 290 up-converts the outbound analog baseband signal into an RF signal, and a power amplifier (PA) 294 within the RF section 290 amplifies the RF signal to produce an outbound RF signal. The outbound RF signal is provided to the antenna via a Tx/Rx switch 298 for transmission to the portable computing device 284.

The processing module 288 of the cell phone 286 further executes digital receiver functions to extract data from an inbound signal in accordance with the particular wireless communication scheme utilized between the cell phone 286 and the portable receiving device 284. For example, digital receiver functions may include, but are not limited to, demodulation, constellation demapping, decoding, and/or descrambling. The inbound signal is first received by the antenna 292 and then provided to the RF section 290 via the Tx/Rx switch 298 and a low noise amplifier (LNA) 296 for down-conversion of the inbound RF signal into an inbound baseband (or low IF) signal. The inbound baseband signal is converted from the analog domain to the digital domain to produce digital reception formatted data that is provided to the processing module 288.

At the portable computing device 284, inbound RF signals are received from the cell phone 286 via an antenna 300 coupled to a first multimode RF unit (MMRFU3). MMRFU3 is configured to operate in accordance with the specific communication scheme (i.e., GSM, LTE, Bluetooth, 802.11, etc.) utilized by the communication link between the cell phone 286 and the portable computing device 284. MMRFU3 includes one or more low noise amplifiers and/or one or more inbound RF bandpass filters. If included, the inbound RF bandpass filter filters the inbound RF signal, which may then be amplified by the low noise amplifier.

The amplified inbound RF signal is provided to a receiver section that, in combination with the RF link interface 302, converts the inbound RF signal, which is in accordance with the selected wireless communication scheme of the cell phone 286, into an inbound RF link signal. The receiver section may perform an up-conversion process or a down conversion process to adjust the carrier frequency of the inbound RF signal to the carrier frequency of the inbound RF link signal, which is output onto the RF link 304 via the RF link interface 302. Note that each MMRFU may include multiple receiver (and transmitter) sections, each configured for a particular wireless communication scheme.

The inbound RF link signal is transmitted over the RF link 304 to the processing module 310, where it is provided to the wireless communication processing module 306 via the RF link interface 302 of the processing module 310. The wireless communication processing module 306 executes digital receiver functions to extract data from the inbound RF link signal in accordance with the particular wireless communication scheme utilized between the cell phone 286 and the portable receiving device 284. The wireless communication processing module 306 then processes the data in accordance with the wireless communication scheme of the cellphone tower 254 (i.e., by executing various digital transmitter functions) to produce an outbound digital signal. By way of example, but not limitation, the various digital transmitter functions may include scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. In addition, the digital transmitter functions may further include converting the outbound data into a single outbound symbol stream for Single Input Single Output (SISO) communications and/or for Multiple Input Single Output (MISO) communications and converting the outbound data into multiple outbound symbol streams for Single Input Multiple Output (SIMO) and/or Multiple Input Multiple Output (MIMO) communications.

The outbound digital signal is further processed by the RF link interface 302 for transmission via the RF link 304 to one or more of the multimode RF units. For example, the outbound digital signal may be up-converted or down-converted to a particular frequency to produce an outbound RF link signal. In addition, the outbound RF link signal will include a header section that identifies one or more of the multimode RF units that are to further process the outbound RF link signal. In one embodiment, the outbound digital signal may be transmitted in one or more packets using a Ethernet protocol, a collision avoidance protocol and/or another shared medium protocol. In another embodiment, a channel on the RF link 304 may be assigned for transmitting the outbound digital signal to the one or more multimode RF units. Allocation of the RF link channel may be a static allocation and/or a dynamic allocation. For example, a particular type of communication (e.g., WLAN access, cellular voice, cellular data, Bluetooth, 60 GHz) may have a static allocation of one or more channels, while another type of communication may have a dynamic allocation of one or more channels for each multimode RF unit that is supporting the communication.

Each of the multimode RF units receives the outbound digital signal from the RF link 304 via the RF link interface 302 and, after any necessary conversion by the RF link interface 302, interprets the signal to determine whether it is to further process the outbound signal. When the multimode RF unit is to further process the outbound signal, it configures itself in accordance with the selected wireless communication scheme to convert the outbound signal into one or more outbound RF signals for transmission to the cellphone tower 254. By transmitting the outbound digital signal to multiple MMRFU's, antenna diversity 308 can be used to increase the range and reliability of the outbound RF signals.

Figure 41:
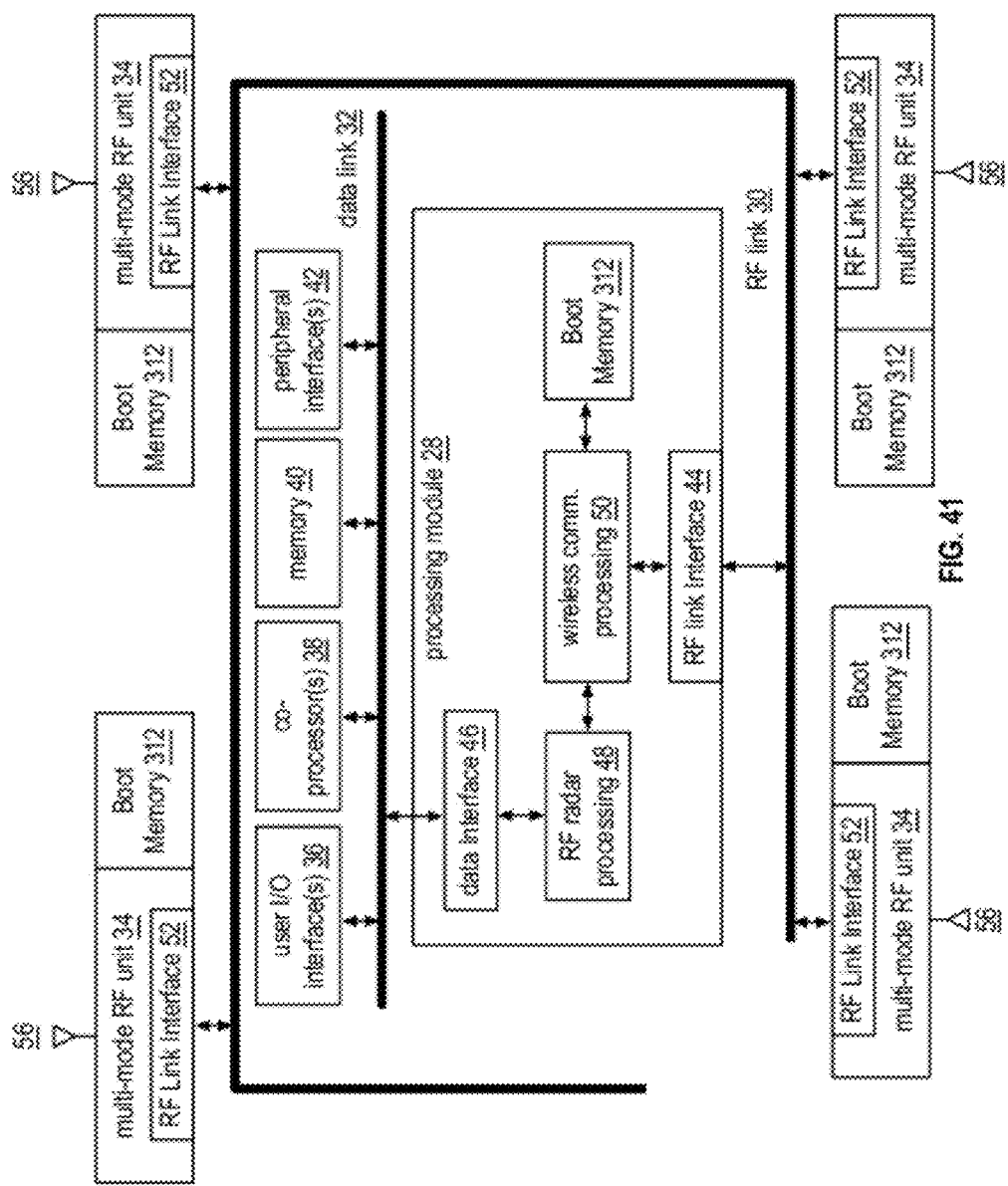
FIG. 41 is a schematic block diagram of another embodiment of a portable computing device for receiving downloaded boot memory software in accordance with the present invention.

FIG. 41 is a schematic block diagram of another embodiment of a portable computing device for receiving downloaded boot memory software. In FIG. 41, each multimode RF unit 34 is coupled to or includes a respective boot memory 312. In addition, the wireless communication protocol module 50 is also coupled to a respective boot memory 312. Each boot memory 312 contains boot software for various communication schemes and protocols/standards related thereto. In an exemplary embodiment, each boot memory 312 is a non-volatile memory.

To easily update the boot software in each boot memory 312, new boot memory software can be downloaded into the portable computing device via one of the multimode RF units 34 from any number of sources (e.g., Internet, other portable computing device, home/office network, wireless hard drive, etc.). The multimode RF unit 34 that receives the new boot memory software transmits the new boot memory software to the processing module 28 via RF link interfaces 52 and the RF link 30. Upon receiving the new boot memory software, the processing module 28 stores the software in the boot memory 312 coupled to the wireless communication processing module 50 and, upon reboot, instructs the wireless communication processing module 50 to transmit the new boot software out to all multimode RF units 34 for storage in their respective boot memories 312.

Figure 42:
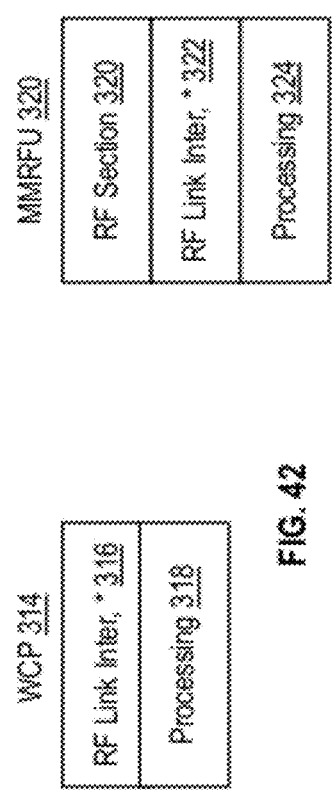
FIG. 42 is a diagram of an embodiment of a boot memory for use within a portable computing device in accordance with the present invention.

FIG. 42 is a diagram of an embodiment of a boot memory for use within a portable computing device. The boot memory for the wireless communication processing module 314 is partitioned for RF link interface software updates 316 and processing updates (i.e., any RF wireless standards) 318. The multimode RF unit boot memory 320 is also partitioned for RF section software updates 320, RF link interface software updates 322 and processing updates 324 (i.e., any RF wireless standard). Each time the portable computing unit is rebooted, the wireless communication processing module 314 and each multimode RF unit 320 loads the latest boot software from its respective boot memory. Previous software versions can be stored on the portable computing device's hard drive.

Figure 43:
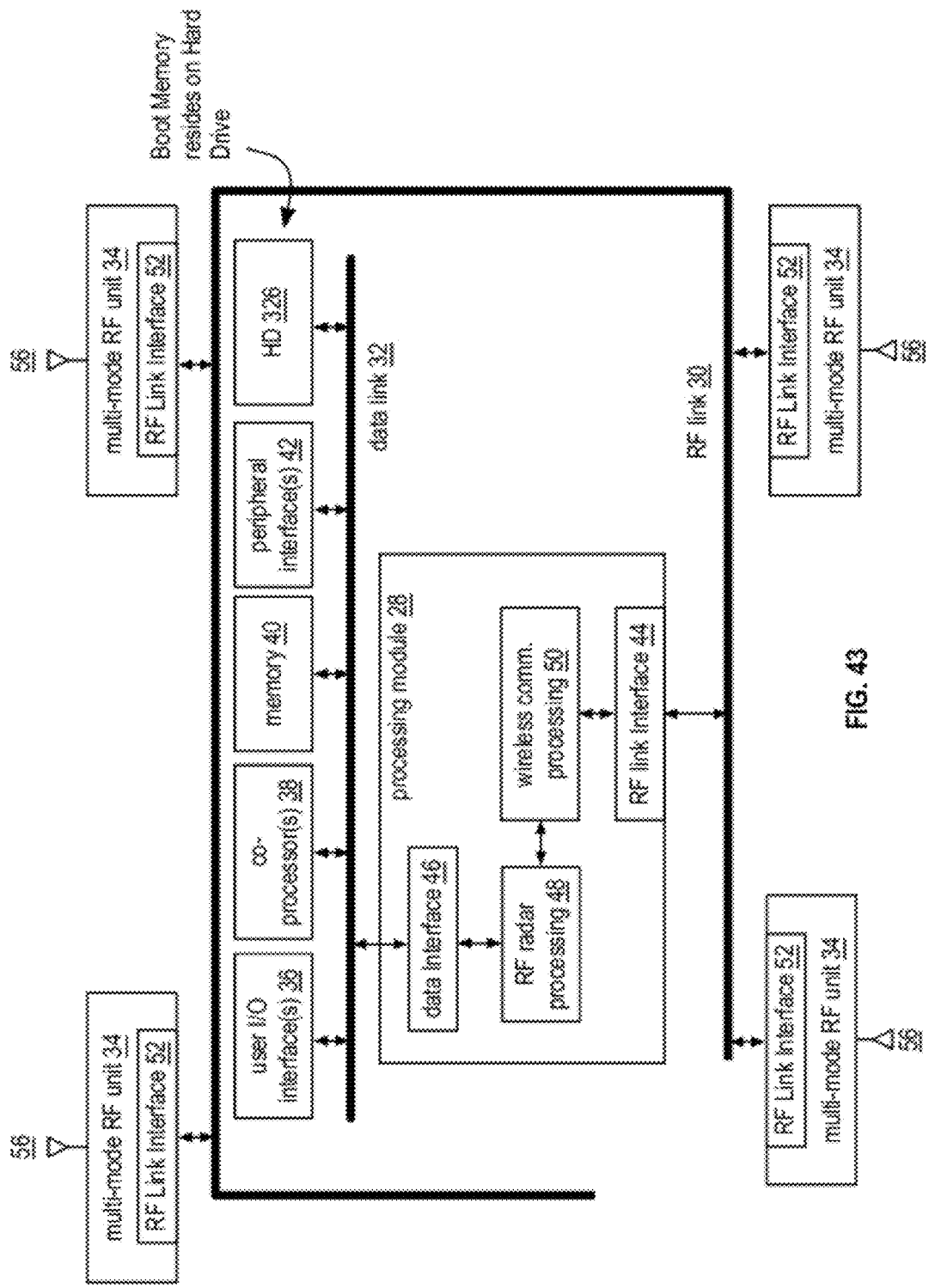
FIG. 43 is a schematic block diagram of another embodiment of a portable computing device for receiving downloaded boot memory software in accordance with the present invention.

FIG. 43 is a schematic block diagram of another embodiment of a portable computing device for receiving downloaded boot memory software. In FIG. 43, the boot memory resides on the hard drive 326 of the portable computing device and is accessible to the wireless communication processing module 50 via the data link 32 and each multimode RF unit 34 via the RF link 30 and data link 32. In this embodiment, the RF link interface software is hard coded to ensure no updates or changes are made to the RF link interface software.

Figure 44:
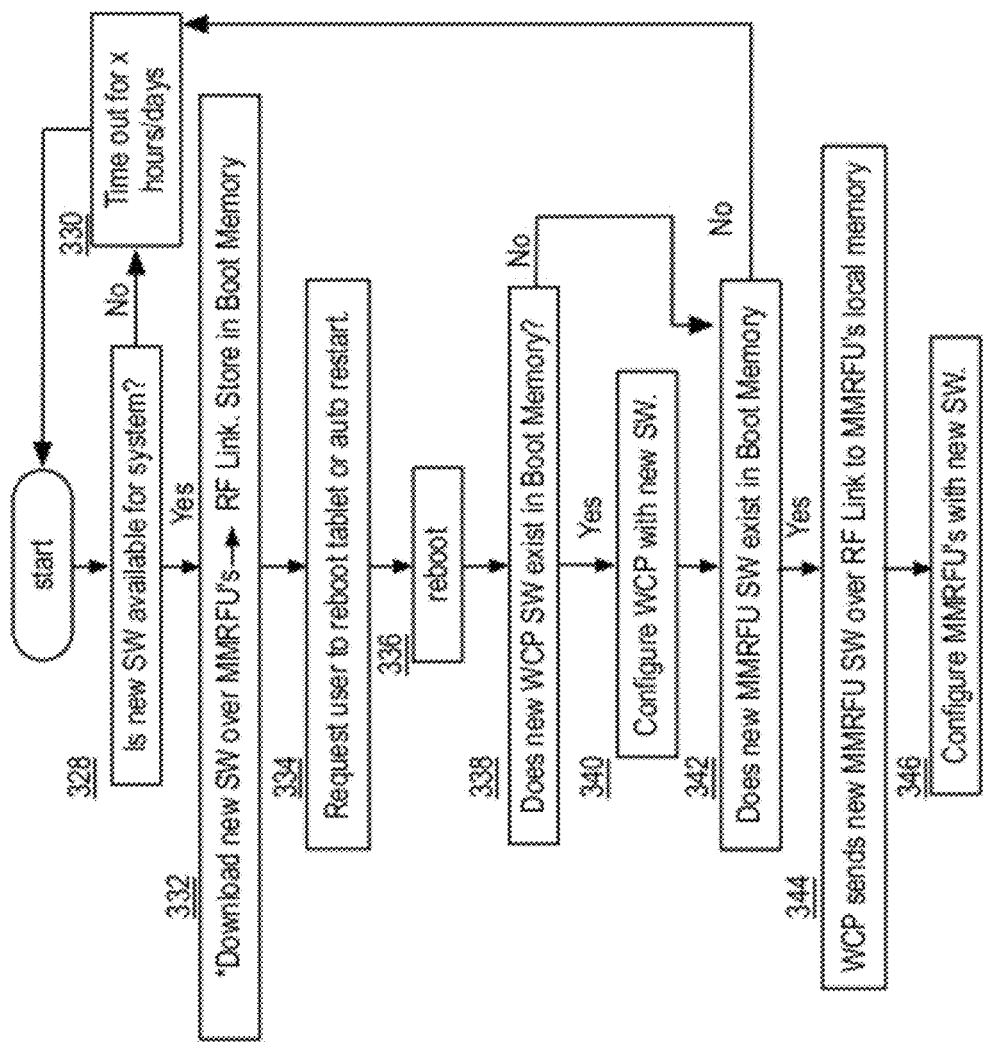
FIG. 44 is a logic diagram of an embodiment of a method for downloading boot memory software into a portable computing device in accordance with the present invention.

FIG. 44 is a logic diagram of an embodiment of a method for downloading boot memory software into a portable computing device that begins with the portable computing device determining whether new boot software is available 328. If no, the method times out for a predetermined time (i.e., hours/days) before repeating 330. If yes, the method continues with the portable computing device downloading new boot software via a multimode RF unit for storage in the central boot memory 332.

The method then continues with the portable computing device requesting the user to reboot or performing an auto restart of the portable computing device 334. During reboot 336, the portable computing device determines whether new wireless communication processing module (WCP) boot software is stored in the boot memory 338. If so, the wireless communication processing module is configured with the new boot software 340. The method then continues with the portable computing device determining whether new multimode RF unit (MMRFU) boot software is stored in the boot memory 342. If so, the wireless communication processing module transmits the new MMRFU software over the RF link to the MMRFU's local memory 344 and the MMRFU's are configured with the new software 346.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:
1. A portable computing device comprises:
   a three-dimensional (3D) touch screen that includes:
      a two-dimensional (2D) touch screen section; and
      a plurality of radio frequency (RF) radar modules that recognize 3D user input via 3D tracking; and
   a core module operable to:
      determine whether the 3D touch screen is in a 3D mode or a 2D mode, wherein the 3D tracking of the 3D touch screen in initiated responsive to 2D user input;
      when the 3D touch screen in the 3D mode:
         receive one or more radar signals via one or more of the plurality of RF radar modules;
         contemporaneously receive a 2D touch command from the 2D touch screen section; and interpret the one or more radar signals as a 3D gesture to produce a 3D input signal that augments the 2D touch command;
a wired RF link; and
a plurality of multi-mode RF units operably coupled to the wired RF link;
wherein the core module communicates:
control information with one or more of the plurality of multi-mode RF units in a first frequency band via the wired RF link;
data of a wireless communication with one or more of the plurality of multi-mode RF units in a second frequency band via the wired RF link; and
clock information to the plurality of multi-mode RF units via the wired RF link in a third frequency band, distinct from the first frequency band and the second frequency band.

2. The portable computing device of claim 1 further comprises:
a wired RF link, wherein:
the one or more of the plurality of RF radar modules generates one or more RF radar signals;
the one or more RF radar signals is converted into one or more inbound RF link radar signals;
the one or more inbound RF link radar signals is conveyed, via the wired RF link, to the core module; and
the core module converts the one or more inbound RF link radar signals into the one or more radar signals.

3. The portable computing device of claim 1 wherein the plurality of multi-mode RF units includes the plurality of RF radar modules.

4. The portable computing device of claim 3 further comprises:
the one or more of the plurality of RF radar modules generates one or more RF radar signals; and
one or more of the multi-mode RF units converts the one or more RF radar signals into one or more inbound RF link radar signals, wherein the one or more inbound RF link radar signals are communicated to the core module via the wired RF link in the second frequency band or in a fourth frequency band.

5. The portable computing device of claim 1, wherein the core module interpreting the one or more radar signals further comprises:
generating x, y, z coordinates of an object with respect to an x-y coordinate system of the 2D touch screen section based on the one or more radar signals;
determining motion of the object based on variations of the x, y, z, coordinates of the object over a period of time; and
generating the 3D input signal based on the motion.

6. The portable computing device of claim 5, wherein the plurality of RF radar modules comprises:
an RF radar transmitter module operable to transmit an outbound RF radar signal; and
a plurality of RF radar receiver modules that are position in a grid manner within the 3D touch screen, wherein an RF radar receive module of the plurality of RF radar receiver modules receive a reflection of the outbound RF radar signal off the object to produce an inbound RF radar signal.

7. The portable computing device of claim 5, wherein the plurality of RF radar modules comprises:
a plurality of RF radar receiver antennas and a plurality of RF radar transmitter antennas that are position in a grid manner within the 3D touch screen, wherein one or more of RF radar transmitter antennas of the plurality of RF radar transmitter antennas transmits one or more outbound RF radar signals and wherein one or more RF radar receive antennas of the plurality of RF radar receiver antennas receive one or more reflections of the one or more outbound RF radar signals off the object to produce one or more inbound RF radar signals.

8. The portable computing device of claim 1, wherein the core module is further operable to:
when the 3D touch screen is in the 2D mode:
receive a 2D signal from the 2D touch screen section; and
interpret the 2D signal to produce a 2D input signal.

9. A portable computing device comprises:
a two-dimensional (2D) touch screen section;
a three-dimensional (3D) touch screen that includes a plurality of horizon-to-horizon radio frequency (RF) radar modules that recognize 3D user input via 3D tracking; and
a core module operable to:
determine whether the 3D touch screen is in a 3D mode or a 2D mode, wherein the 3D tracking of the 3D touch screen in initiated responsive to 2D user input;
when the 3D touch screen in the 3D mode:
receive one or more RF radar signals from one or more of the plurality of horizon-to-horizon RF radar modules;
contemporaneously receive a 2D touch command from the 2D touch screen section; and
interpret the one or more RF radar signals as a 3D gesture to produce a 3D input signal that augments the 2D touch command;
an RF link; and
a plurality of multi-mode RF units operably coupled to the RF link;
wherein the core module communicates:
control information with one or more of the plurality of multi-mode RF units in a first frequency band via the RF link;
data of a wireless communication with one or more of the plurality of multi-mode RF units in a second frequency band via the RF link; and
clock information to the plurality of multi-mode RF units via the RF link in a third frequency band, distinct from the first frequency band and the second frequency band.

10. The portable computing device of claim 9, wherein the core module interpreting the one or more radar signals further comprises:
generating x, y, z coordinates of an object with respect to an origin on a surface of the 3D touch screen based on the one or more radar signals;
when the z coordinate of the x, y, z coordinates is near zero, determining that the one or more RF radar signals corresponds to the 2D input signal; and
when the z coordinate is not near zero, determining that the one or more RF radar signals corresponds to the 3D input signal.

11. The portable computing device of claim 10, wherein the core module interpreting the one or more radar signals further comprises:
determining motion of the object based on variations of the x, y, z, coordinates of the object over a period of time; and
generating the 3D input signal based on the motion.

12. The portable computing device of claim 9, wherein a horizon-to-horizon RF radar module of the plurality of horizon-to-horizon RF radar modules comprises:
a transceiver module operable to:
generate a radar transmit signal;
receive a shaped radar receive signal:
a shaping module operable to:
shape the radar transmit signal in accordance with a control signal to produce an outbound radar signal;
shape an inbound radar signal in accordance with the control signal to produce the shaped radar receive signal; and
an antenna structure that includes a plurality of spiral coils and an antenna, wherein, with respect to the antenna, the plurality of spiral coils provides an effective dish and wherein the effective dish transmits the outbound radar signal and receives the inbound radar signal.

13. The portable computing device of claim 12 further comprises:
the core module further operable to generate an antenna structure tuning control signal; and
the antenna structure is operable to adjust the effective dish of the plurality of spiral coils in accordance with the antenna structure tuning control signal to tune a scan area of the horizon-to-horizon RF radar module.

14. The portable computing device of claim 9 further comprises:
one or more of the plurality of horizon-to-horizon RF radar modules operable to detect an object;
the core module operable to determine whether the object is a gesturing object; and
when the object is the gesturing object:
the core module operable to determine x, y, z coordinates of the object with respect to an origin on a surface of the 3D touch screen; and
the core module operable to interpret the x, y, z coordinates of the object to determine when gesturing of the object corresponds to the 2D input signal or the 3D input signal.

15. The portable computing device of claim 9 further comprises:
a wired RF link, wherein:
the one or more of the plurality of horizon-to-horizon RF radar modules generates one or more RF radar signals;
the one or more RF radar signals is converted into one or more inbound RF link radar signals;
the one or more inbound RF link radar signals is conveyed, via the wired RF link, to the core module; and
the core module converts the one or more inbound RF link radar signals into the one or more radar signals.

16. The portable computing device of claim 9 wherein the plurality of multi-mode RF units includes the plurality of horizon-to-horizon RF radar modules.

17. The portable computing device of claim 16 further comprises:
the one or more of the plurality of horizon-to-horizon RF radar modules generates one or more RF radar signals; and
one or more of the plurality of multi-mode RF units converts the one or more RF radar signals into one or more inbound RF link radar signals, wherein the one or more inbound RF link radar signals are communicated to the core module via the RF link in the second frequency band or in a fourth frequency band.

18. A core module for a portable computing device, the core module comprises:
a processing module configured to determine whether a 3D touch screen is in a 3D mode or a 2D mode, wherein the 3D tracking of the 3D touch screen in initiated responsive to 2D user input;
wherein the processing module is operable, when the 3D touch screen in the 3D mode, to:
contemporaneously receive a 2D touch command and 3D user input; and
interpret the 3D user input as a 3D gesture to produce a 3D input signal that augments the 2D touch command;
an RF link; and
a plurality of multi-mode RF units operably coupled to the RF link that facilitate wireless RF communication with the portable computing device and further that facilitate 3D operation of the 3D touch screen;
wherein the core module communicates:
control information with one or more of the plurality of multi-mode RF units in a first frequency band via the RF link;
data of a wireless communication with one or more of the plurality of multi-mode RF units in a second frequency band via the RF link; and
clock information to the plurality of multi-mode RF units via the RF link in a third frequency band, distinct from the first frequency band and the second frequency band.

19. The core module of claim 18 is further operable to:
generate x, y, z coordinates of an object with respect to an origin on a surface of the portable computing device based on one or more RF radar signals;
when the z coordinate of the x, y, z coordinates is near zero, determine that the one or more RF radar signals corresponds to the 2D input signal; and
when the z coordinate is not near zero, determine that the one or more RF radar signals corresponds to the 3D input signal.

20. The core module of claim 19 is further operable to:
determine motion of the object based on variations of the x, y, z, coordinates of the object over a period of time; and
generate the 3D input signal based on the motion.

21. The core module of claim 19 is further operable to:
determine whether an object is a gesturing object, wherein the one or more RF radar signals corresponds to detection of the object; and
when the object is the gesturing object:
determine x, y, z coordinates of the object with respect to an origin on a surface of the portable computing device; and
interpret the x, y, z coordinates of the object to determine when gesturing of the object corresponds to the 2D input signal or the 3D input signal.

* * * * *